(12) United States Patent
Ohashi et al.

(10) Patent No.: US 10,443,698 B2
(45) Date of Patent: Oct. 15, 2019

(54) POWER TRANSMITTING APPARATUS

(71) Applicant: KABUSHIKI KAISHA F.C.C., Hamamatsu-shi, Shizuoka (JP)

(72) Inventors: Tatsuyuki Ohashi, Hamamatsu (JP); Jun Ishimura, Hamamatsu (JP); Atsuho Ota, Hamamatsu (JP); Kaoru Iida, Hamamatsu (JP)

(73) Assignee: Kabushiki Kaisha F.C.C., Hamamatsu-Shi (JP)

( * ) Notice: Subject to any disclaimer, the term of this patent is extended or adjusted under 35 U.S.C. 154(b) by 979 days.

(21) Appl. No.: 14/858,750

(22) Filed: Sep. 18, 2015

(65) Prior Publication Data
US 2016/0010735 A1    Jan. 14, 2016

Related U.S. Application Data

(63) Continuation of application No. PCT/JP2014/052807, filed on Feb. 6, 2014.

(30) Foreign Application Priority Data

Mar. 19, 2013    (JP) ................. 2013-057271

(51) Int. Cl.
  *F16H 45/02*    (2006.01)
  *F16H 45/00*    (2006.01)
  *F16D 3/12*    (2006.01)
  *F16F 15/134*    (2006.01)

(52) U.S. Cl.
  CPC .............. *F16H 45/02* (2013.01); *F16D 3/12* (2013.01); *F16F 15/134* (2013.01); *F16H 45/00* (2013.01); *F16H 2045/002* (2013.01); *F16H 2045/0205* (2013.01); *F16H 2045/0215* (2013.01);
  (Continued)

(58) Field of Classification Search
  None
  See application file for complete search history.

(56) References Cited

U.S. PATENT DOCUMENTS

2011/0192692 A1    8/2011 Werner et al.

FOREIGN PATENT DOCUMENTS

| CN | 102356255 A | 9/2016 |
|---|---|---|
| JP | 2009-115294 | 11/2007 |
| JP | 2010-084828 | 4/2010 |

(Continued)

*Primary Examiner* — Colby M Hansen
(74) *Attorney, Agent, or Firm* — Knobbe, Martens, Olson & Bear LLP

(57) ABSTRACT

An object of the present disclosure is to provide a power transmitting apparatus which can sufficiently damp the torque variation and also can further improve the fuel consumption. For achieving the object of the present disclosure above, there is provided a power transmitting apparatus of a vehicle comprising a damper mechanism including dampers having spring properties for damping torque variations of an engine and being able to arbitrarily and selectively transmit or cut off a driving power of an engine to wheels characterized in that the power transmitting apparatus further comprises a spring property switching device for arbitrarily switching spring properties of the damper mechanism; and a spring property controller for actuating the spring property switching device to switch the spring properties according to the running state of the vehicle.

25 Claims, 24 Drawing Sheets

(52) U.S. Cl.
CPC ............... *F16H 2045/0226* (2013.01); *F16H 2045/0294* (2013.01)

(56) References Cited

FOREIGN PATENT DOCUMENTS

| | | |
|---|---|---|
| JP | 2011-214635 | 10/2011 |
| JP | 2008-151291 | 2/2017 |
| WO | WO2010/107050 A1 | 9/2010 |
| WO | PCT/JP2014/052807 * | 9/2014 |

* cited by examiner

| Control mode | | ON - OFF | | Damper clutch |
|---|---|---|---|---|
| | | Solenoid 22 | Solenoid 23 | |
| Mode 1 | Low spring rate state | ○ | ○ | OFF |
| Mode 2 | Slip control | ○ | × | Control (Linear solenoid 25) |
| Mode 3 | High spring rate state | ○ | × | ON (Linear solenoid 25) |

Fig. 9

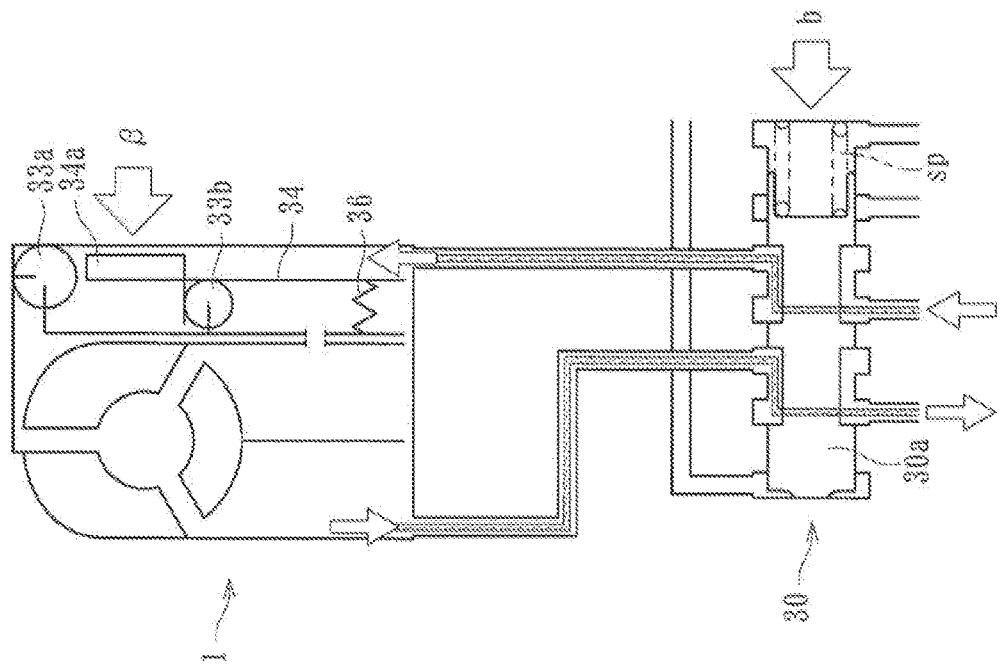
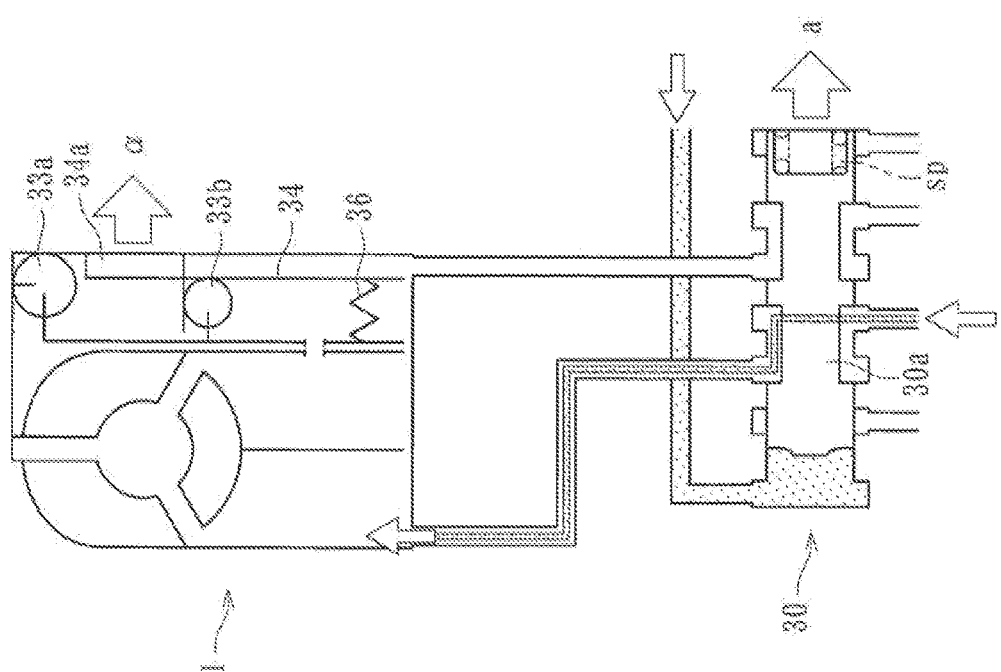
Fig. 22A
Fig. 22B

POWER TRANSMITTING APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Technical Field

The present disclosure relates to power transmitting apparatuses for arbitrarily and selectively transmitting or cutting off the driving power of an engine to or from wheels of a vehicle.

2. Description of the Related Art

In a conventional power transmitting apparatus (e.g., automatic transmission) of a vehicle, an automatic power transmitting apparatus can be provided with a torque converter (e.g., so-called "torque converter type" starting system) or with a starting clutch (e.g., so-called "start-clutch type" starting system). In the automatic power transmitting apparatus of the torque converter type, it is possible to improve the starting performance at the time of start due to the torque amplification function of the torque converter. On the other hand, in the automatic power transmitting apparatus of the start-clutch type, it is possible to improve the power transmitting efficiency since it does not have slippage during the steady running of vehicle which would be caused by the apparatus of the torque converter type.

As described above, in the automatic transmission of the torque converter type, although it has a technological advantage of improvement of the starting performance at the time of start due to the torque amplification function of the torque converter, it has a technological disadvantage of reduction of the power transmitting efficiency due to slippage of the torque converter. On the other hand, in the automatic transmission of the start-clutch type, although it has a technological advantage of improvement of the power transmitting efficiency during the steady running of vehicle since it does not have slippage peculiar to the torque converter type, it has a technological disadvantage of reduction of the starting performance since it does not have the torque amplifying function of the torque converter at the time of start and thus it is necessary to increase the reduction ratio of the transmission to prevent reduction of the starting performance.

In order to solve these defects of the prior art, there has been proposed in Japanese Patent Document JP 2010-84828 A a power transmitting apparatus which is provided with a clutch means for switching between a first power transmitting system for transmitting the driving power of the engine to wheels via a torque converter and a second power transmitting system for transmitting the driving power of the engine to wheels without use of a torque converter and is able to satisfy both functions of improving the starting performance due to the torque amplifying function of the torque converter and of improving the power transmitting efficiency during the steady running of vehicle. In such a power transmitting apparatus of the prior art, it is possible to damp torque variation during transmission of the driving power of the engine by using a damper having a predetermined spring property disposed in the power transmission path of the second power transmitting system when the apparatus has been switched to the second power transmitting system by a clutch means.

SUMMARY

Recently, it has been desired to hold a state switched to the second power transmitting system over a wider engine speed range to further improve fuel consumption. That is, under the first power transmitting system, since the power transmission is performed via the torque converter, fuel consumption would be worsened due to deterioration of the power transmission efficiency. On the other hand, under the second power transmitting system, since the power transmission is performed without transfer through the torque converter, it is possible to improve fuel consumption if the second power transmitting system could be held over a wider engine speed range.

However, since the power transmitting apparatus of the prior art has a single spring property, it is possible that a condition in which the torque variation cannot be sufficiently damped (e.g., a running condition in which the engine rotates at a speed lower than idle speed during a deceleration process of the vehicle) would be caused when trying to hold the second power transmitting system over more wider engine speed range. Such a problem is not limited only to the power transmitting apparatus provided with the torque converter. In some cases, the problem is common to power transmitting apparatus not provided with the torque converter if the power transmitting apparatus includes a damper mechanism comprising a damper having a spring property for damping the torque variation of the engine and is capable of arbitrary and selective transmission or cutting-off of the driving power of the engine to wheels.

It is, therefore, an object of the present disclosure to provide a power transmitting apparatus which can sufficiently damp the torque variation and also can further improve the fuel consumption.

Thus, in some embodiments, a power transmitting apparatus of a vehicle can include a damper mechanism including at least first and second dampers having spring properties for damping torque variations of an engine. The dampers can be able to arbitrarily and selectively transmit or cut off a driving power of an engine to wheels. In some embodiments, the power transmitting apparatus comprises: a spring property switching device (which can serve as a spring property switching means) for arbitrarily switching spring properties of the damper mechanism; and a spring property controller (which can serve as a spring property control means) for actuating the spring property switching device to switch the spring properties according to the running state of the vehicle.

In some embodiments, the power transmitting apparatus further comprises a torque converter mounted on the vehicle and having a torque amplifying function, and a clutch device (which can serve as a clutch means) for switching a power transmitting system between a first power transmitting system for transmitting the driving power of the engine to the wheels via the torque converter and a second power transmitting system for transmitting the driving power of the engine to the wheels without passing through the torque converter. In some embodiments, the damper mechanism is disposed in the power transfer path the second power transmitting system.

In some embodiments, the damper mechanism comprises two dampers of a first damper and a second damper. In some embodiments, the spring constant of the damper mechanism can be switched between a low spring rate state and a high spring rate state by arbitrarily and selectively connecting the first damper and the second damper by the spring property switching device.

In some embodiments, the low spring rate state can be attained by connecting both the first damper and the second damper in series with respect to the power transmitting system of the engine. In some embodiments, the high spring rate state can be attained by connecting either one of the first damper or the second damper to the power transmitting system of the engine.

In some embodiments, the damper mechanism is formed of a connection in which the power transmitting system having the first damper and the power transmitting system having the second damper and the spring property switching device are connected in parallel with respect to each other, and a shift from the low spring rate state to the high spring rate state can be attained by switching the spring property switching device to the connected state.

In some embodiments, the shift from the low spring rate state to the high spring rate state can be attained by switching the spring property switching device to the connected state subject to performance of a torque-down control of the engine.

In some embodiments, the shift from the low spring rate state to the high spring rate state can be performed subject to performance of the torque-down control of a predetermined time interval.

In some embodiments, the power transmitting apparatus further comprises an urging device (which can serve as an urging means) for normally urging the spring property switching device toward the connected state.

In some embodiments, the first damper is arranged at a position radially outward from the outer circumference of the spring property switching device.

In some embodiments, the power transmitting apparatus further comprises a torque converter mounted on the vehicle. In some embodiments, an output member of a turbine of the torque converter is formed with through apertures through which operating fluid for actuating the spring property switching device can flow.

In some embodiments, a holding member holding the first damper is formed with through apertures through which operating fluid for actuating the spring property switching device can flow.

In some embodiments, when the vehicle is in a running state in which the engine rotates at a rotational speed lower than an idle speed during the vehicle is in the deceleration state, the spring property switching device switches a spring rate to the high spring rate state at a range resonating with the engine in the low spring rate state and switches a spring rate to the low spring rate state at a range resonating with the engine in the high spring rate state.

In some embodiments, when the vehicle is in a running state in which a running speed of the vehicle is held substantially constant at a throttle opening smaller than a predetermined opening, or in a running state in which the vehicle is accelerated more gently than a predetermined degree, the spring property switching device switches a spring rate to the low spring rate state.

In some embodiments, when the vehicle is in a running state in which the vehicle is accelerated more rapidly than a predetermined degree, the spring property switching device switches a spring rate to the high spring rate state.

In some embodiments, the spring property switching device switches a spring rate to the high spring rate state when the engine is stopped and holds the high spring rate state when the engine is started.

In some embodiments, the spring property switching device comprises a damper clutch for cutting off or connecting a predetermined portion of the second power transmitting system in accordance with a signal from the spring property controller.

In some embodiments, the damper clutch can be slip-controlled during the switching process for cutting off and connecting the predetermined portion of the second power transmitting system.

In some embodiments, the spring property controller holds (e.g., is pre-programmed with) a predetermined control map capable of referring to a control mode depending on a running state of the vehicle and can control the spring property switching device in accordance with the control mode of the control map.

In some embodiments, the spring property controller can refer to the control map only when the temperature of operating oil of the damper clutch is higher than a predetermined value.

In some embodiments, the damper clutch is disposed within the torque converter.

In some embodiments, the transmission apparatus including the torque converter and the transmission unit is disposed in a power transfer path of the power transmitting system from the engine to the wheel and the clutch device is disposed within the transmission apparatus.

In some embodiments, the transmission unit is the automatic transmission.

In some embodiments, the automatic transmission is the Continuously Variable Transmission (CVT).

In some embodiments, the clutch device is disposed within the torque converter.

According to some embodiments, since the power transmitting apparatus comprises a spring property switching device for arbitrarily switching spring properties of the damper mechanism, and a spring property controller for actuating the spring property switching device to switch the spring properties according to the running state of the vehicle, it is possible to sufficiently damp the torque variation and also to further improve the fuel consumption.

According to some embodiments, since the power transmitting apparatus further comprises a torque converter mounted on the vehicle and having a torque amplifying function, and a clutch means for switching a power transmitting system between a first power transmitting system for transmitting the driving power of the engine to the wheels via the torque converter and a second power transmitting system for transmitting the driving power of the engine to the wheels without passing through the torque converter, and the damper mechanism is disposed in the power transfer path of the second power transmitting system, it is possible to operate in the second power transmitting system over a wider engine rotational speed range, to sufficiently damp the torque variation and also to further improve the fuel consumption.

According to some embodiments, since the damper mechanism comprises two dampers of a first damper and a second damper, and the spring constant of the damper mechanism can be switched between a low spring rate state and a high spring rate state by arbitrarily and selectively connecting the first damper and the second damper by the spring property switching device, it is possible to more appropriately and smoothly switch the spring property of the damper mechanism depending on running state.

According to some embodiments, since the low spring rate state can be attained by connecting both the first damper and the second damper in series with respect to the power transmitting system of the engine, and the high spring rate state can be attained by connecting either one of the first damper or the second damper to the power transmitting system of the engine, it is possible to more surely and smoothly switch the spring properties of the damper mechanism.

According to some embodiments, since the damper mechanism is formed of a connection in which the power transmitting system having the first damper and the power transmitting system having the second damper and the spring property switching device are connected in parallel with each other, and a shift from the low spring rate state to the high spring rate state can be attained by switching the spring property switching device to the connected state, it is possible to reduce torque applied to the spring property switching device in the high spring rate state and thus to use a further smaller spring property switching device.

According to some embodiments, since the shift from the low spring rate state to the high spring rate state can be attained by switching the spring property switching device to the connected state subject to performance of a torque-down control of the engine, it is possible to surely attain damping of the torque variation by the first damper in the high spring rate state.

According to some embodiments, since the shift from the low spring rate state to the high spring rate state can be performed subject to performance of the torque-down control of a predetermined time interval, it is possible to reduce a feeling of idle running of a vehicle caused by torque drop during the shift of the spring property switching means by reducing the "predetermined time interval".

According to some embodiments, since the power transmitting apparatus comprises an urging device for normally urging the spring property switching device toward the connected state, it is possible to further improve the response of the spring property switching device.

According to some embodiments, since the first damper is arranged at an overlapped position radially outward with respect to the outer circumference of the spring property switching device, it is possible to reduce the axial dimension of the power transmitting apparatus by at least a radially overlapped length and thus to use a first damper having a larger radial dimension.

According to some embodiments, since the power transmitting apparatus further comprises a torque converter mounted on the vehicle, and an output member of a turbine of the torque converter is formed with through apertures through which operating fluid for actuating the spring property switching device can flow, it is possible to improve the response of the spring property switching device.

According to some embodiments, since a holding member holding the first damper is formed with through apertures through which operating fluid for actuating the spring property switching device can flow, it is possible to improve the response of the spring property switching device.

According to some embodiments, it is possible to avoid generation of resonation even when the vehicle is in a running state in which the engine rotates at a rotational speed lower than an idle speed when the vehicle is in the deceleration state and thus to more appropriately hold the state of the second power transmitting system.

According to some embodiments, it is possible to surely prevent generation of "stayed sound" even when the vehicle is in a running state in which a running speed of the vehicle is held substantially constant at a throttle opening smaller than a predetermined opening or in a running state in which the vehicle is accelerated more gently than a predetermined degree and thus to more appropriately hold the state of the second power transmitting system.

According to some embodiments, it is possible to surely prevent generation of a repeating phenomenon of rickety vibration (so-called "jerk" phenomenon) caused during acceleration or deceleration of the vehicle and thus to hold the second power transmitting system in a more appropriate condition.

According to some embodiments, the spring property switching device can switch a spring rate to the high spring rate state when the engine is stopped and thus to surely prevent generation of resonance of the second power transmitting system when the engine is started.

According to some embodiments, since the spring property switching device comprises a damper clutch for cutting off or connecting a predetermined portion of the second power transmitting system in accordance with a signal from the spring property controller, it is possible to more surely and smoothly switch the spring properties of the damper mechanism.

According to some embodiments, since the damper clutch can be slip-controlled during the switching process for cutting off and connecting the predetermined portion of the second power transmitting system, it is possible to more smoothly switch the spring properties of the damper mechanism.

According to some embodiments, since the spring property controller holds a predetermined control map capable referring to a control mode depending on a running state of the vehicle and can control the spring property switching device in accordance with the control mode of the control map, it is possible to more smoothly and appropriately switch the spring properties of the damper mechanism.

According to some embodiments, since the spring property controller can refer to the control map only when the temperature of operating oil of the damper clutch is higher than a predetermined value, it is possible to prohibit control according to the control map when the temperature of operating oil of the damper clutch is lower than a predetermined value.

According to some embodiments, since the damper clutch is disposed within the torque converter, it is possible to arbitrarily and efficiently switch the spring properties of the damper mechanism and to simplify an outside structure of the torque converter.

According to some embodiments, it is possible to easily apply the power transmitting apparatuses of the present disclosure to vehicles provided with the transmission apparatus including the torque converter and the transmission unit, the transmission unit being an automatic transmission and the automatic transmission being the CVT (Continuously Variable Transmission).

According to some embodiments, since the clutch device is disposed within the torque converter, it is possible to more efficiently switch the first and second power transmitting systems and to simplify an outside structure of the torque converter.

BRIEF DESCRIPTION OF THE DRAWINGS

FIG. 9 is table showing a control of the clutch device and a spring property switching device of the power transmitting apparatus of FIG. 1;

FIGS. 22A and 22B are schematic views showing operations of the spring property switching device of the power transmitting apparatus of FIG. 16;

DETAILED DESCRIPTION

Preferable embodiments of various combinations of the present inventions are described below with reference to the accompanying drawings.

Figure 1:
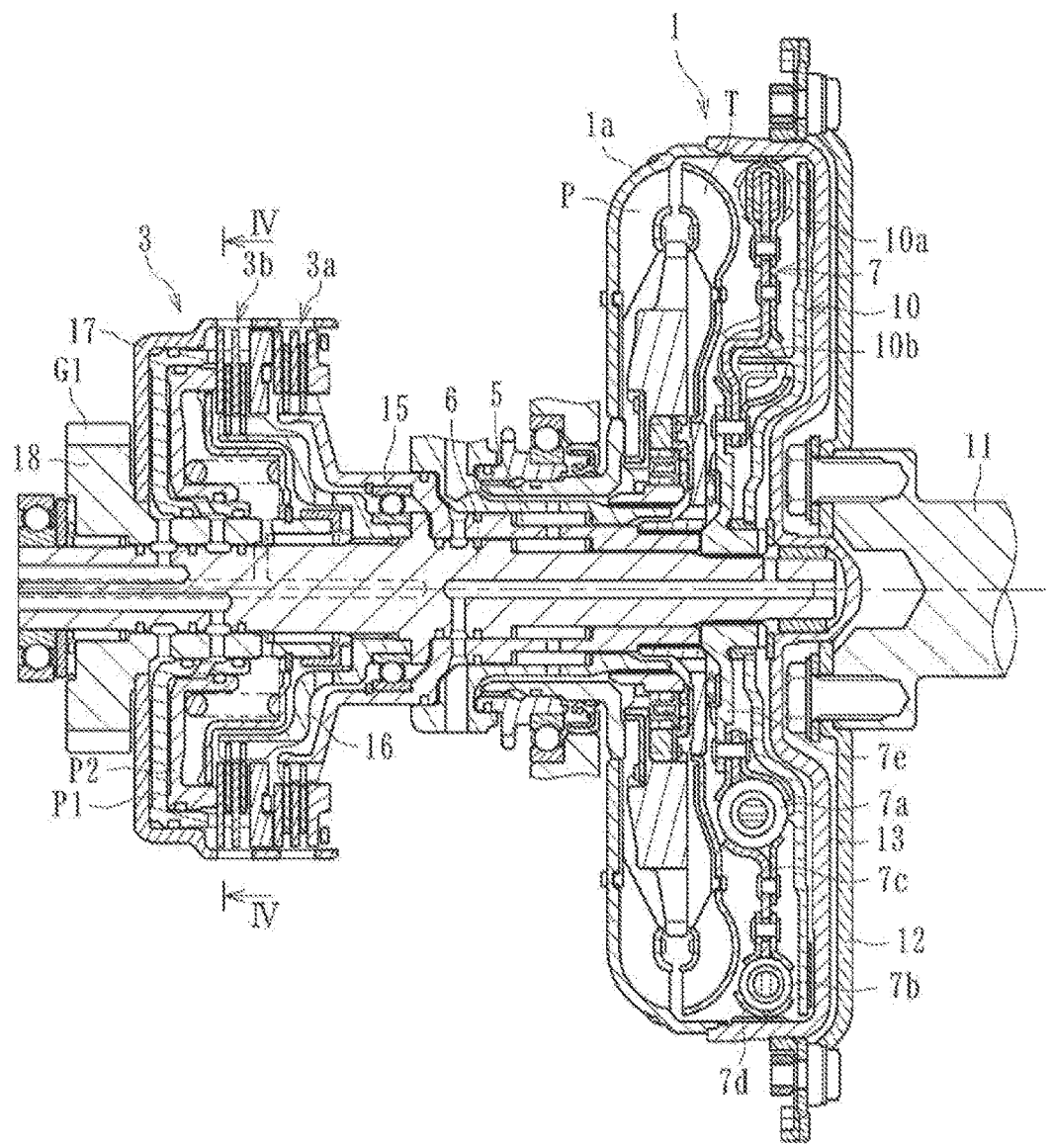
FIG. 1 is a longitudinal section view of a power transmitting apparatus of a first embodiment of the present disclosure.
Figure 2:
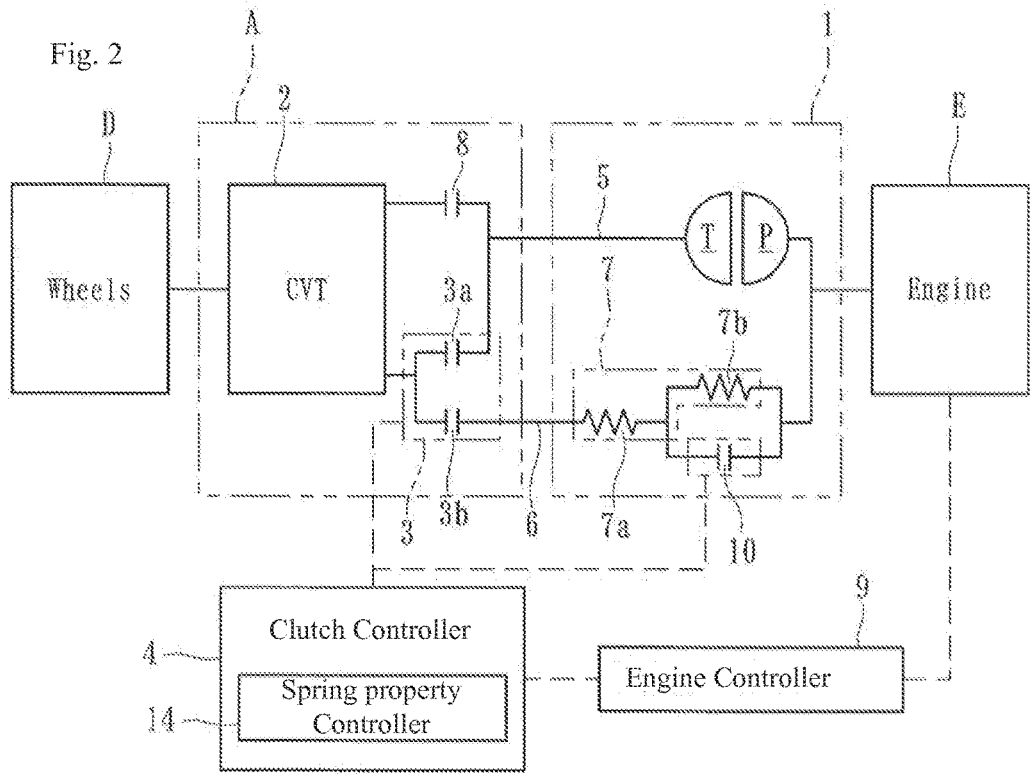
FIG. 2 is a schematic view showing basic concept of the power transmitting apparatus of FIG. 1.

A power transmitting apparatus, in accordance with some embodiments, can be configured to transmit and cut off the driving power of an engine (e.g., a source of driving power) of an automobile (e.g., a vehicle) to and from wheels (e.g., driving wheels). The power transmitting apparatus can comprises, as shown in FIGS. 1-5, a torque converter 1, a clutch device 3 (which can serve as a clutch means), a damper mechanism 7, a damper clutch 10 as a spring property switching device (which can serve as a spring property switching means), and a spring property controller 14 (which can serve as a spring property control means). FIG. 1 is a longitudinal section view showing a main part of the power transmitting apparatus of some embodiment, and FIG. 2 is a schematic view showing a basic concept of the power transmitting apparatus of some embodiments.

As shown in FIG. 2, the torque converter 1 and a transmission apparatus A are arranged in the power transmitting system from the engine E to the wheels D. The transmission apparatus A includes an automatic transmission (e.g., a Continuous Variable Transmission (CVT)) 2 other than the clutch device 3 and a third clutch device 8 (which can also serve as a clutch means or a third clutch means). A numeral 11 (FIG. 1) denotes an input shaft extending from the engine E.

The torque converter 1 has torque amplifying function for amplifying a torque from the engine E and transmits it to the CVT 2. The torque converter 1 can comprise torque converter covers 1a, 13 containing therein hydraulic fluid in a sealed manner and rotated around their axes by the driving power of the engine E, a pump P formed on the cover 1a and rotated together with the cover 1a, and a turbine T arranged oppositely to the pump P and rotatable at a side of the cover 13.

The input shaft 11 is connected to the torque converter cover 13 via a cover member 12. When the input shaft 11, the cover member 12, the torque converter covers 13, 1a and the pump P are rotated, the rotational torque can be transmitted to the turbine T via liquid (hydraulic fluid) and can be amplified. Then a first driving shaft 5 spline-engaged with the turbine T is rotated and thus the torque is transmitted to the CVT 2 (first power transmitting system). The phrase "first power transmitting system for transmitting the driving power of the engine E to the wheels D via the torque converter 1" in the present disclosure can be considered as a driving power transmitting system comprising the torque converter cover 1a, the pump P, the turbine T and the first driving shaft 5.

On the other hand, the damper mechanism 7 is formed of dampers having spring properties for damping torque variation and disposed in the power transfer path of the second power transmitting system. In some embodiments, the damper mechanism 7 comprises two dampers (e.g., a first damper 7a and second damper 7b), connecting portion 7d projected radially inward from the inner circumference of the torque converter cover 13, and connecting member 7c connected to the connecting portion 7d via the second damper 7b. The connecting member 7c is connected to the connecting portion 7e via the first damper 7a and the inner circumference of the connecting portion 7e is spline-engaged with the outer circumference of a second driving shaft 6. In the damper mechanism 7 of the present embodiment, pluralities of springs forming the first damper 7a and the second damper 7b are coaxially arranged (e.g., the first damper 7a is arranged radially inward and the second damper 7b is radially outward).

Thus, the driving torque of the engine E can be transmitted to the CVT 2 with the cover member 12, the torque converter cover 13, the connecting member 7c and the second driving shaft 6 being rotated when the input shaft 11 is rotated by the driving power of the engine E (second power transmitting system). In the second power transmitting system, it is possible to transmit the driving power of the engine E to the wheels D via the damper mechanism 7 and the second driving shaft 6 without transferring power through the torque converter 1 and also possible to damp the torque variation due to the spring properties of the first damper 7a and the second damper 7b. The phrase "second power transmitting system for transmitting the driving power of the engine E to the wheels D without via the torque converter 1" in the present invention can be considered as a driving power transmitting system comprising the torque converter cover 13, the connecting member 7c and the second driving shaft 6.

As described above, the first driving shaft 5 can be rotated by the driving power of the engine E via the driving transmission system of the torque converter 1 and connected to the first clutch means 3a, on the other hand, the second driving shaft 6 can be rotated by the driving power of the engine E without via the driving transmission system of the torque converter 1 and connected to the second clutch device 3b. According to the present embodiment, the first driving shaft 5 is formed of a hollow cylindrical member and the second driving shaft 6 is rotationally arranged within the first driving shaft 5 coaxially therewith. Accordingly, the first driving shaft 5 and the second driving shaft 6 can be rotated separately and independently each other by selectively actuating the clutch device 3.

Figure 3:
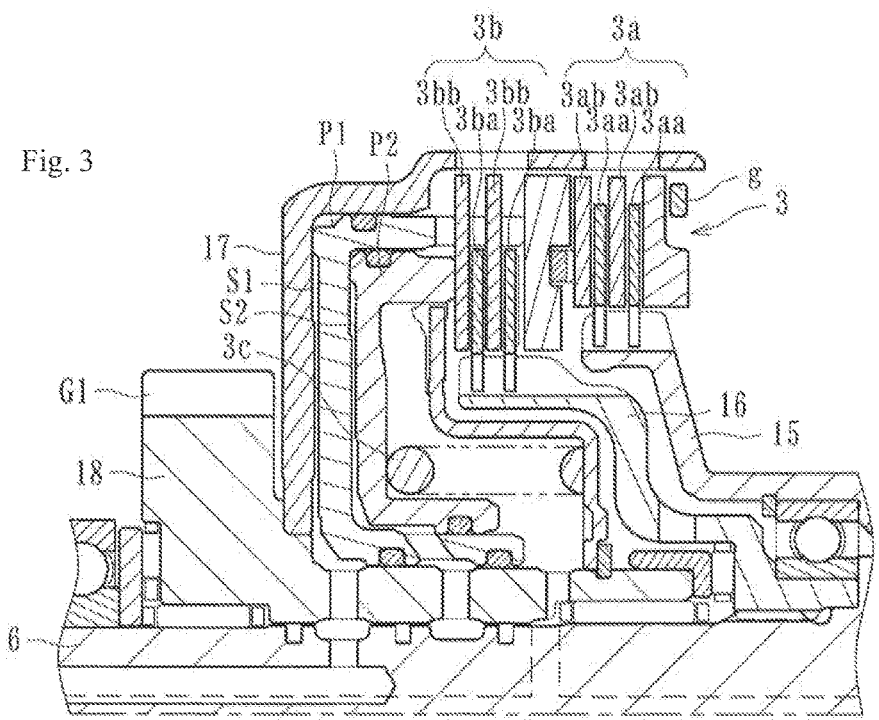
FIG. 3 is a partially enlarged view of the power transmitting apparatus of FIG. 1.

The clutch device 3 can be actuated during the forward running of the vehicle and comprises a first clutch device 3a (which can serves as a clutch means or first clutch means) for achieving a state of the first power transmitting system for transmitting the driving power of the engine E (driving source) to the wheels D (driving wheels) via the driving transmission system of the torque converter 1 and a second clutch device 3b (which can serve as a clutch means or a second clutch means) for achieving a state of the second power transmitting system for transmitting the driving power of the engine E (driving source) to the wheels D (driving wheels) without via the driving transmission system of the torque converter 1. As shown in FIG. 3, the first clutch device 3a and the second clutch device 3b are formed of a plurality of driving-side clutch discs 3aa, 3ba and a plurality of driven-side clutch discs 3ab, 3bb slidable in right and left directions to form a multiple disc clutch. Other clutch designs can be used.

In the first clutch device 3a, the driving-side clutch discs 3aa are mounted on an interlocking member 15 connected to the first driving shaft 5 and interlocking therewith and the driven-side clutch discs 3ab are mounted on an boxy member 17 so that the driving-side clutch discs 3aa and the driven-side clutch discs 3ab are alternately arranged into a laminated arrangement. Thus, mutually adjacent driving-side clutch discs 3aa and driven-side clutch discs 3ab can be press-contacted and separated from each other (e.g., release of press-contacting force).

In the second clutch device 3b, the driving-side clutch discs 3ba are mounted on an interlocking member 16 connected to the second driving shaft 6 and interlocking therewith and the driven-side clutch discs 3bb are mounted on an boxy member 17 so that the driving-side clutch discs 3ba and the driven-side clutch discs 3bb are alternately arranged to form a laminated arrangement. Thus, mutually adjacent driving-side clutch discs 3ba and driven-side clutch discs 3bb can be press-contacted and separated from each other (e.g., release of press-contacting force).

As shown in FIG. 3, the clutch device 3 has, within the same boxy member 17, the first clutch device 3a and the second clutch device 3b, and two hydraulic pistons P1, P2 corresponding respectively to the first clutch device 3a and the second clutch device 3b, and the first clutch device 3a and the second clutch device 3b can be arbitrarily (e.g., at any time, and/or in response to user input) and selectively actuated by controlling hydraulic pressures acting on the hydraulic pistons P1, P2.

Figure 4:
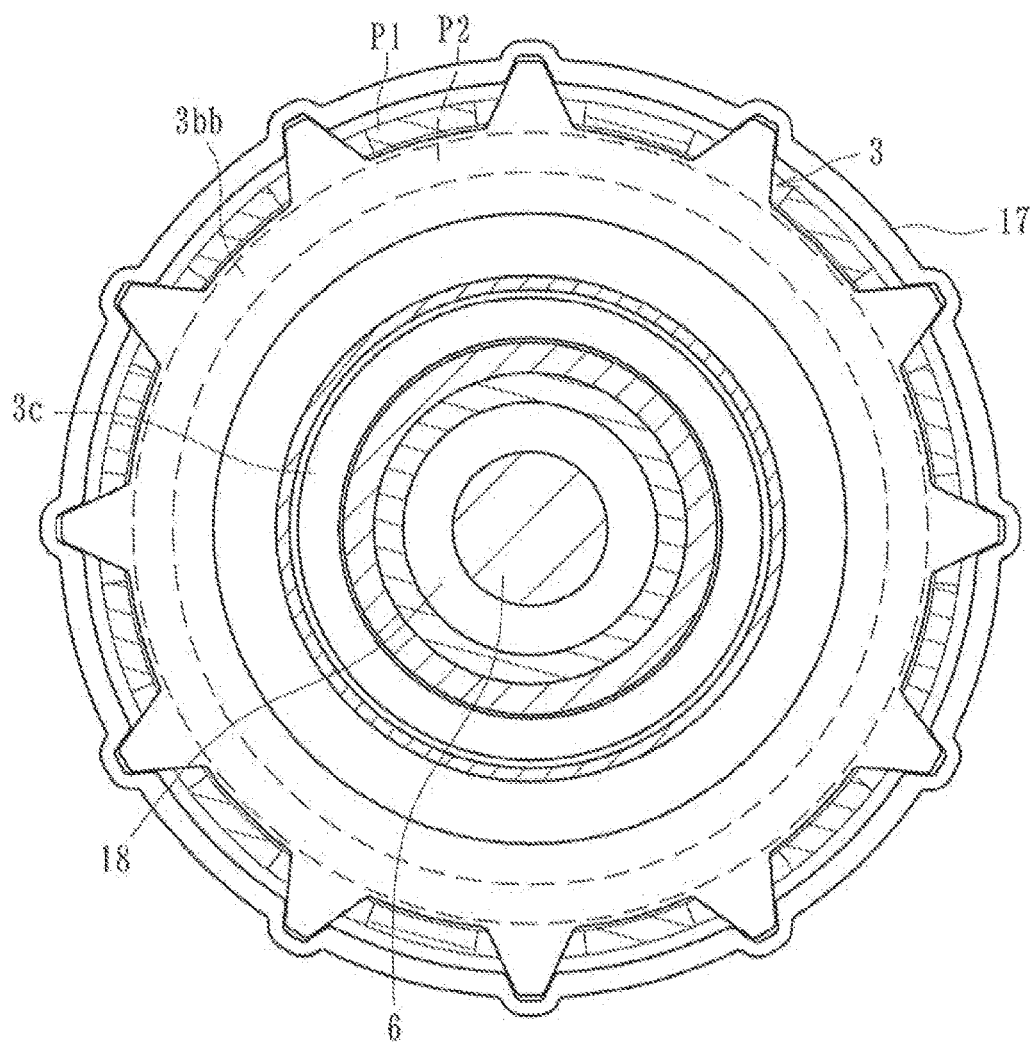
FIG. 4 is a cross-sectional view taken along a line IV-IV of FIG. 1.
Figure 5:
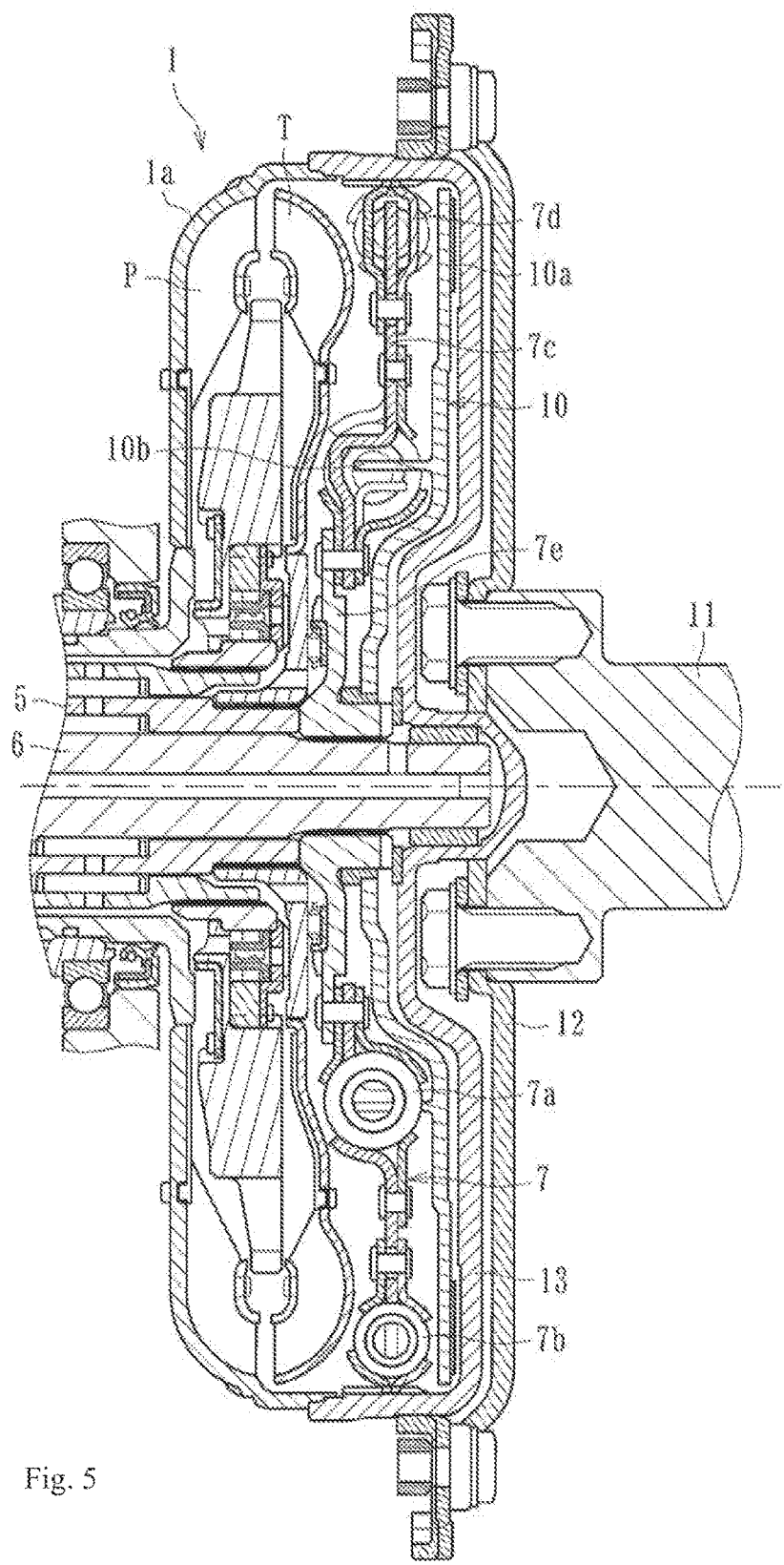
FIG. 5 is an enlarged longitudinal section view showing an internal structure of a torque converter of the power transmitting apparatus of FIG. 1.

That is, the clutch device 3 is configured such that the hydraulic piston P1 is moved toward the right (FIG. 3) against urging force of a return spring 3c by introducing hydraulic fluid into a hydraulic chamber S1 between the boxy member 17 and the hydraulic piston P1 and then the tip ends of the hydraulic piston P1 push the first clutch device 3a toward the right to press-contact the driving-side clutch discs 3aa and the driven-side clutch discs 3ab to each other. In this case, the driving-side clutch discs 3ba and the driven-side clutch discs 3bb are formed with recessed portions along their outer circumferences as shown in FIG. 4 and thus the tip ends of the hydraulic piston P1 can pass through the recessed portions.

In some embodiments, the clutch device 3 is configured such that the hydraulic piston P2 is moved toward the right (FIG. 3) against urging force of a return spring 3c by introducing hydraulic fluid into a hydraulic chamber S2 between the hydraulic piston P1 and the hydraulic piston P2 and then the tip end of the hydraulic piston P2 pushes the second clutch device 3b toward the right to press-contact the driving-side clutch discs 3ba and the driven-side clutch discs 3bb to each other. Accordingly, it is possible to arbitrarily and selectively actuate the first clutch device 3a or the second clutch device 3b by controlling hydraulic pressures for actuating the hydraulic pistons P1, P2. A reference character "g" in FIG. 3 denotes stoppers respectively arranged in relation to the first clutch device 3a and the second clutch device 3b to make them independently actuate.

Figure 7:
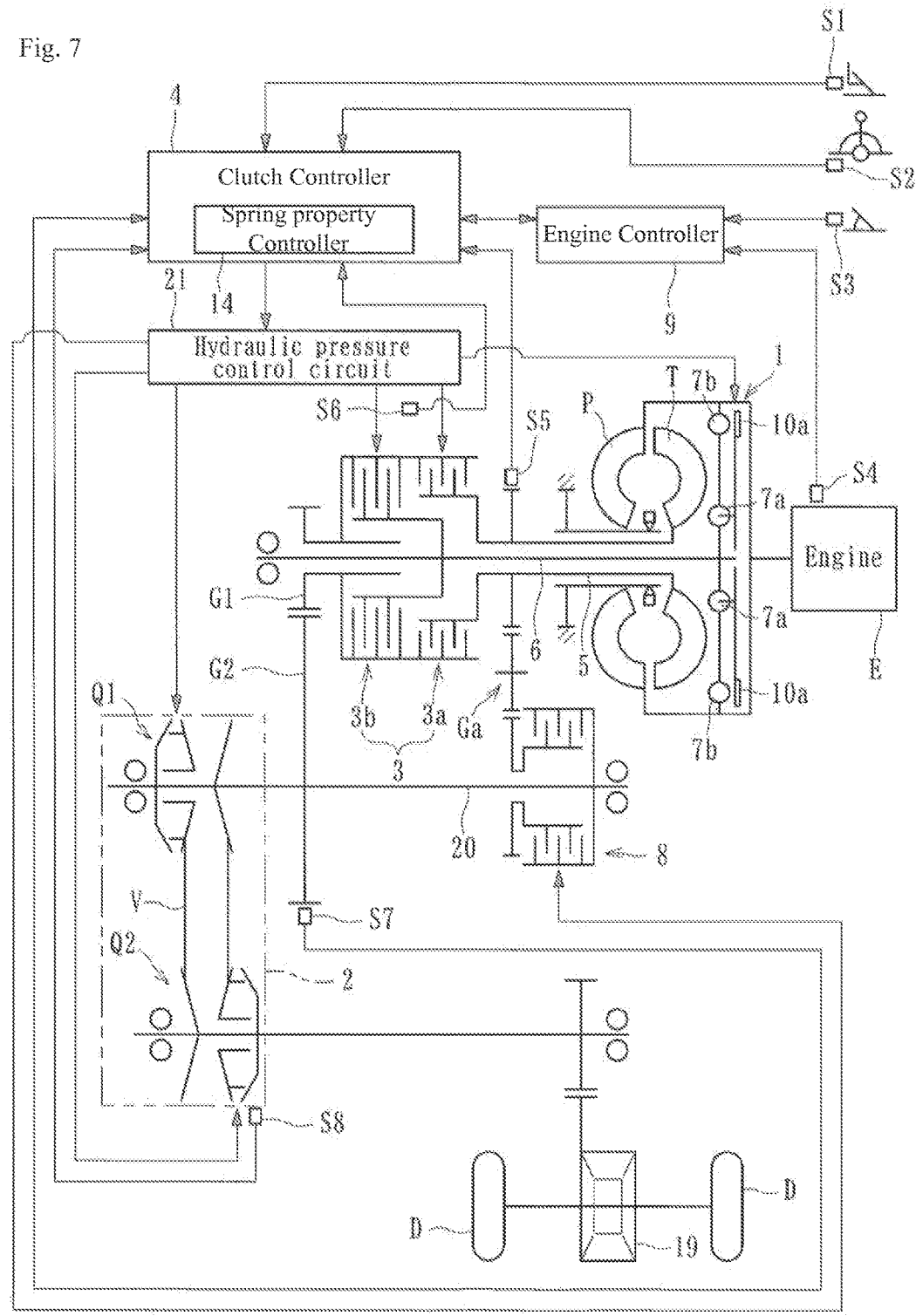
FIG. 7 is a schematic view showing a whole arrangement of the power transmitting apparatus of FIG. 1 including a continuously variable transmission (CVT)

The boxy member 17 forming the clutch device 3 is connected to an interlocking member 18 formed with a gear G1. As shown in FIG. 7, the gear G1 can be mated with a gear G2 mounted on an output shaft 20. Thus, the driving power of the engine E transmitted from the first clutch device 3a or the second clutch device 3b is transmitted to the interlocking member 18 via the boxy member 17 and then to the CVT 2 via the output shaft 20.

On the other hand, a third clutch device 8 (which can also serve as a clutch means or a third clutch means) comprises a multiple disc clutch similarly to the first and second clutch devices 3a, 3b and is configured to transmit the driving power of the engine E to the wheels D via the driving transmission system of the torque converter 1 when the vehicle is in the reverse mode. That is, a gear mounted on the interlocking member 15 is mated with a gear mounted on the output shaft 20 via an idle gear Ga (FIG. 7) arranged therebetween and the driving power of the engine E is transmitted to the third clutch device 8 with the rotational direction being reversed when a shift lever (not shown) of the vehicle is operated to the reverse range ("R").

The clutch controller 4 (FIGS. 2 and 7), which can be considered as serving as a clutch control means, can be electrically connected to an engine controller (ECU) 9, which can be considered as serving as an engine control means, and arbitrarily and selectively actuate the hydraulic pistons P1 or P2 by introducing hydraulic fluid to the hydraulic chamber S1 or S2 in accordance with the running states (e.g. vehicle speed, inclination angle of body, engine speed, throttle opening, oil temperature etc.) of the vehicle to arbitrarily and selectively actuate the first or second clutch device 3a or 3b in order to selectively transmit the driving power of the engine E to the wheels D via the driving transmission system of the torque converter 1 (first power transmitting state) or without via the torque converter 1 (second power transmitting state).

Figure 10:
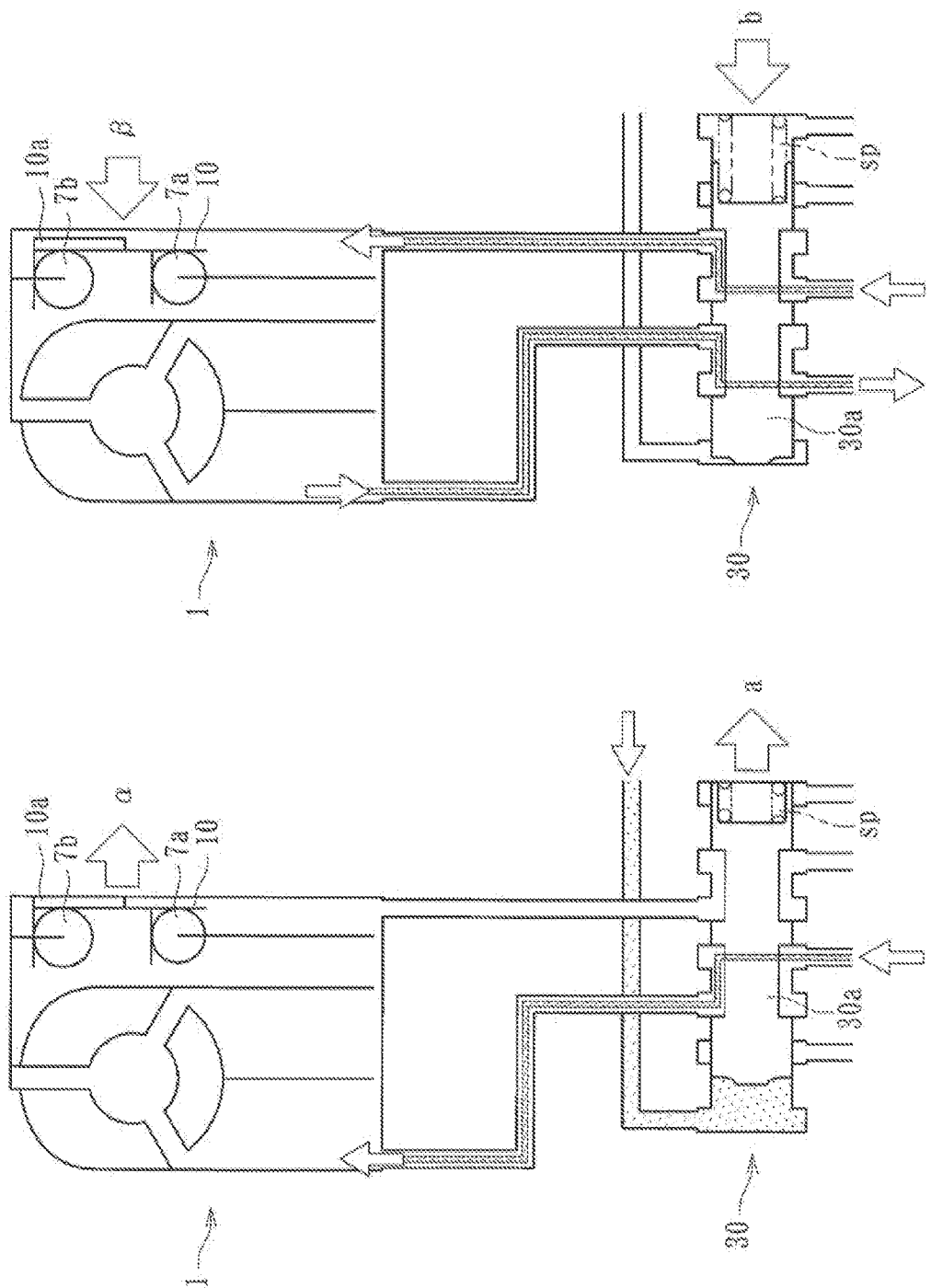
FIGS. 10A and 10B are schematic views showing operations of the spring property switching device of the power transmitting apparatus of FIG. 1.

As shown in FIG. 1, a damper clutch (which can serve as a spring property switching means) 10 comprises a frictional member 10a mounted on its outer circumference and a connecting part 10b formed on the disc member at predetermined positions thereof to be connected to the first damper 7a and can be moved between a connected position (FIG. 10A) in which the frictional member 10a is contacted with the inside surface of the torque converter cover 13 and a separated position (FIG. 10B) in which the frictional member 10a is separated from the inside surface of the torque converter cover 13. That is, as shown in FIGS. 10A and 10B, hydraulic fluid supplied from a hydraulic valve 30 acts on the front side of the damper clutch 10 and moves the damper clutch 10 toward a direction α (FIG. 10A) and thus the damper clutch 10 is switched from the separated position to the connected position. On the other hand, when the hydraulic fluid supplied from the hydraulic valve 30 acts on the back side of the damper clutch 10, the damper clutch 10 is moved to a direction β (FIG. 10B) and thus switched from the connected position to the separated position.

More particularly, the hydraulic valve 30 comprises a piston member 30a normally urged toward a direction of an arrow "b" in FIG. 10B by a spring "sp" and thus the hydraulic fluid supplied to the damper clutch 10 can be circulated at the time of non-operation of a solenoid 22 (SH A) (FIG. 8) and act on the back side of the damper clutch 10 to move the damper clutch 10 to the separated position. On the other hand, when the hydraulic fluid is supplied from the solenoid 22 (SH A) to the hydraulic valve 30, the piston member 30a is moved toward a direction of an arrow "a" in FIG. 10A against the urging force of the spring "sp" and thus the hydraulic fluid acts on the front side of the damper clutch 10 to move the damper clutch 10 to the connected position.

When the damper clutch 10 is in the connected position, since the driving power is transmitted from the torque converter cover 13 to the damper clutch 10 via the frictional member 10a, the driving power can be further transmitted to the first damper 7a via the connecting part 10b (FIG. 1) to rotate the second driving shaft 6, during which, if the transmitting torque is varied, it will be damped exclusively by the first damper 7a.

On the other hand, when the damper clutch 10 is in the separated position, since the driving power is transmitted from the torque converter cover 13 to the connecting member 7c (FIG. 1), the driving power can be transmitted to the second driving shaft 6 via both the first and second dampers 7a, 7b, during which, if the transmitting torque is varied, it will be damped by both the first and second dampers 7a, 7b.

Figure 6:
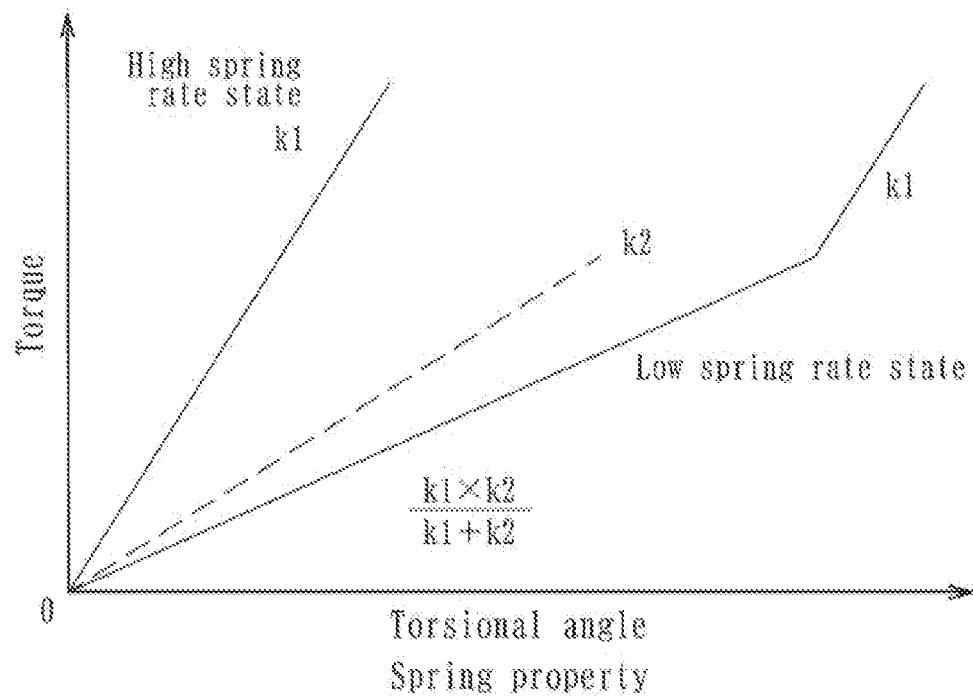
FIG. 6 is a graph showing the spring property of a damper mechanism of the power transmitting apparatus of FIG. 1.

Accordingly, as shown in FIG. 6, when the damper clutch 10 is in the separated position, it is possible to set the second power transmitting system to a low spring rate state by connecting the first damper 7a and the second damper 7b to the second power transmitting system in series (i.e. state of the whole spring constant being expressed as k1·k2/(k1+k2), wherein k1 is the spring constant of the first damper 7a and k2 is the spring constant of the second damper 7b) and it is also possible, when the damper clutch 10 is in the connected position, to set the second power transmitting system to a high spring rate state by connecting only the first damper 7a to the second power transmitting system (i.e. state of the whole spring constant being expressed as k1 of the spring constant of the first damper 7a).

In the graph of FIG. 6, the ordinate shows a torque and the abscissa shows a torsional angle of the torque converter cover 13 relative to the second driving shaft 6 (i.e. a displacement of the first and second dampers 7a, 7b in the compressive direction). Although it is described above to have the high spring rate state by connecting only the first damper 7a to the second power transmitting system, it is also possible to have the high spring rate state by connecting either one of the first damper 7a or the second damper 7b to the second power transmitting system (e.g. only the second damper 7b may be connected to the second power transmitting system).

The spring property controller 14 can be included in the clutch controller 4 (which can be considered to serve as a clutch control means) and intended to obtain the spring property depending on the running state by actuating the spring property switching device (i.e. the damper clutch 10) in accordance with the running state of the vehicle. That is, since the clutch controller 4 can determine the running state of the vehicle from signals from the engine controller (ECU) 9, it is possible to switch the low spring rate state (state in which the first damper 7a and the second damper 7b are connected in series with a predetermined portion of the second power transmitting system being cut off by the damper clutch 10) and the high spring rate state (state in which only the first damper 7a is connected to the second power transmitting system with a predetermined portion of the second power transmitting system being connected by the damper clutch 10) by actuating the damper clutch 10 (i.e. the spring property switching means) by signals depending on the running state and cutting off or connecting the predetermined portion (i.e. portion in which the damper clutch 10 is arranged in the second power transmitting system).

Specifically, when the vehicle is running in a deceleration mode and the engine E is rotating at a speed lower than the idling speed, the spring property controller 14 can switch the damper clutch 10 to the high spring rate state of the connected position in the resonance range with the engine E in the low spring rate, and switches the damper clutch 10 to the low spring rate state of the separated position in the resonance range with the engine E in the high spring rate.

Such a control enables reduction or prevention of resonance even when the vehicle is running in a deceleration mode and the engine E is rotating at a speed lower than the idling speed and thus to hold the second power transmitting system in a more appropriate condition. In some embodiments, the vehicle is configured to perform energy regeneration during the deceleration running mode of the vehicle, it is possible to hold the state of second power transmitting system even in the engine speed lower than the idling speed and thus to perform energy regeneration in a wide range of the engine speed.

In addition, the spring property controller 14 in some embodiments can be able to control the damper clutch 10 so that it is switched to the low spring rate state of the separated position when the vehicle is in a running state in which the throttle opening is smaller than a predetermined degree and running speed of the vehicle is kept substantially constant or in a running state in which the vehicle is accelerated more gently than a predetermined degree. This makes it possible to better prevent generation of "stayed sound" within the vehicle and thus to hold the second power transmitting system in a more appropriate condition.

In addition, the spring property controller 14 of in some embodiments can be able to control the damper clutch 10 so that it is switched to the high spring rate state of the connected position when the vehicle in a running state in which the vehicle is more rapidly accelerated than a predetermined degree. This makes it possible to better prevent generation of a repeating phenomenon of rickety vibration (so-called "jerk" phenomenon) caused during acceleration or deceleration of the vehicle and thus to hold the second power transmitting system in a more appropriate condition.

Furthermore, the spring property controller 14 in some embodiments can be able to control the damper clutch 10 so that it is switched to the high spring rate state of the connected position when the engine E is stopped and that the high spring rate state is kept when the engine E is started. This can make it possible to better prevent the resonance of the second power transmitting system at the start of the engine E. That is, since the resonance tends to be caused more easily at the high spring rate state than at the low spring rate state and at a high engine speed range, generation of the resonance can be better reduced or prevented by setting the high spring rate state at the start of the engine E.

Furthermore, the damper clutch 10 of some embodiments can be able to perform slip control for slipping the clutch during switching process (i.e. switching process between the separated state and the connected state of the damper clutch 10 relative to the torque converter 13) of the cutting-off and connection of the predetermined portion of the second power transmitting system. That is, this makes it possible to control the power transmission capacity by slipping the frictional member 10a of the damper clutch 10 relative to the torque converter cover 13 by adjusting the press-contacting force of the frictional member 10a relative to the inside surface of the torque converter cover 13.

According to some embodiments, since the power transmitting apparatus comprises the damper clutch (i.e. spring property switching means) 10 for arbitrarily switching the spring properties of the damper mechanism 7, and a spring property controller 14 for actuating the spring property switching device 10 to switch to the appropriate spring properties depending on the detected running state of the vehicle, it is possible to keep the state of the second power transmitting system in a wider range of the engine speed and thus to further improve the fuel consumption.

In addition, since the damper mechanism 7 comprises two dampers, including the first damper 7a and the second damper 7b and since the damper clutch (spring property switching device) 10 can arbitrarily and selectively connect the first damper 7a and the second damper 7b to switch the spring constant between the low spring rate state and a high spring rate state, it is possible to switch the spring property of the damper mechanism 7 more appropriately and smoothly.

Further according to some embodiments, since the low spring rate state can be obtained by connecting the first and second dampers 7a, 7b in series to the second power transmitting system and since the high spring rate state can be obtained by connecting either one of the first damper 7a or second damper 7b to the second power transmitting system, it is possible to more surely and smoothly switch the spring property of the damper mechanism 7.

In addition, according to some embodiments, since the spring property switching device comprises the damper clutch 10 for cutting off or connecting the predetermined portion of the second power transmitting system in accordance with signals from the spring property controller 14, it is possible to more smoothly and surely switch the spring property of the damper mechanism 7. Furthermore, since the damper clutch 10 as the spring property switching device is capable of slip control for slipping clutch in the process of switching the connection and the cutting-off of second power transmitting system at its predetermined portion, it is possible to more smoothly switch the spring property of the damper mechanism 7.

In addition, since the spring property controller 14 holds a predetermined control map (FIG. 12) to which the control mode can be referred in accordance with the running state of the vehicle and thus the damper clutch (spring property switching device) 10 can be controlled in accordance with the control mode of the control map, it is possible to perform smoother and more appropriate switching of the damper mechanism 7. Particularly, since the spring property controller 14 is configured to refer to the control map when (e.g., sometime only when) the temperature of the hydraulic fluid of the damper clutch 10 is above a predetermined value, it is possible to prohibit the control in accordance with the control map when the temperature of the hydraulic fluid of the damper clutch 10 is below the predetermined value (i.e. when it is more likely that the operation of the damper clutch 10 cannot be smoothly performed).

In addition, since the damper clutch (spring property switching device) 10 is disposed within the torque converter 1 (more particularly, within the torque converter cover 13), it is possible to arbitrarily and efficiently switch the spring property of the damper mechanism 7 and to simplify external structure of the torque converter 1. Furthermore, according to some embodiment, since the torque converter 1 and the transmission apparatus A including the transmission (CVT 2) are arranged in the power transfer path of the power transmitting system from the engine E to the wheels D, the clutch device 3 is arranged within the transmission apparatus A, and the transmission unit 2 comprises an automatic transmission and the transmission unit 2 comprises the CVT, it is possible to easily apply the structure of the present invention to popular vehicles which comprise the torque converter 1 and the transmission apparatus A and the transmission unit 2 comprises the automatic transmission or the CVT 2.

Furthermore, according to some embodiments, since the power transmitting apparatus comprises the clutch controller 4 for arbitrarily and selectively actuating the first clutch device 3a or the second clutch device 3b to transmit the driving power of the engine E to the wheels D via the torque converter 1 (first power transmitting system) or to transmit the driving power of the engine E to the wheels D without transmitting power through the torque converter 1 (second power transmitting system), it is possible to suppress complication and enlargement of the power transmitting apparatus and to improve the starting performance due to the torque amplifying function of the torque converter and the power transmitting efficiency during the steady running of vehicle.

In addition, since the first and second driving shafts 5, 6 are arranged coaxially with respect to each other, the whole size of the power transmitting apparatus can be reduced as compared with a structure in which the first and second driving shafts 5, 6 are arranged in parallel with each other. Furthermore, since the second driving shaft 6 is connected to the engine E via the damper mechanism 7 for damping the torque variation, it is possible to damp vibrations of the engine E transmitted to the second clutch device 3b.

As described above, the automatic transmission 2 of some embodiments is a so-called CVT which is, as shown in FIG. 7, arranged in the power transfer path of the power transmitting system from the power source (engine E) of the vehicle to the driving wheels (wheels D) and between the second clutch device 3b of the clutch device 3 and the wheels D.

As shown in FIG. 7, the CVT 2 comprises two pulleys Q1, Q2 and a belt V extending between the pulleys Q1, Q2 and is structured so that movable sheaves of the pulleys Q1, Q2 are independently actuated by a hydraulic pressure control circuit 21 for controlling the pressure of hydraulic fluid fed from an oil pump 27 (FIG. 8) to vary the belt-running diameters of the pulleys Q1, Q2 to obtain desirable running speeds of the vehicle. The hydraulic pressure control circuit 21 is electrically connected to the clutch controller 4 and further electrically connected to a brake switch S1, a position sensor S2 of a shift lever, an engine controller 9 etc. A reference numeral S3 denotes a throttle opening sensor of an acceleration pedal of the vehicle.

As described above, since the CVT 2 is arranged in the power transfer path of the power transmitting system from the engine E of the vehicle to the wheels D and between the second clutch device 3b of the clutch device 3 and the wheels D, it is possible to let the clutch for advancing the vehicle double as the clutch for transmitting the driving power of the engine E to the wheels W without transmitting power through the driving transmission system of the torque converter 1 in the second clutch device 3b. A reference numeral 19 in FIG. 7 denoted a differential gear of the vehicle. Furthermore, a referential numeral S4 denotes an engine speed sensor for detecting speed of the engine E, a numeral S5 denotes a speed sensor for detecting rotational speed of the first driving shaft 5, a numeral S6 denotes a hydraulic pressure switch for detecting hydraulic pressure of the clutch device 3 (second clutch device 3b in the illustrated embodiment), a numeral S7 denotes a sensor for detecting rotational speed of the second driving shaft 6, and a numeral S8 denotes a sensor for detecting rotational speed of the counter shaft.

The clutch controller 4 of some embodiments comprises the spring property controller 14 and the damper clutch (spring property switching device) 10 can be actuated via the hydraulic pressure control circuit 21 under control of the spring property controller 14. The clutch controller 4 and the spring property controller 14 are electrically connected to the engine controller (ECU) 9 and are adapted to receive electric signals exhibiting the running state of the vehicle from the ECU 9. Accordingly, the spring property controller 14 can actuate the damper clutch 10 at a timing in accordance with the running state of the vehicle based on the received electric signals.

Figure 8:
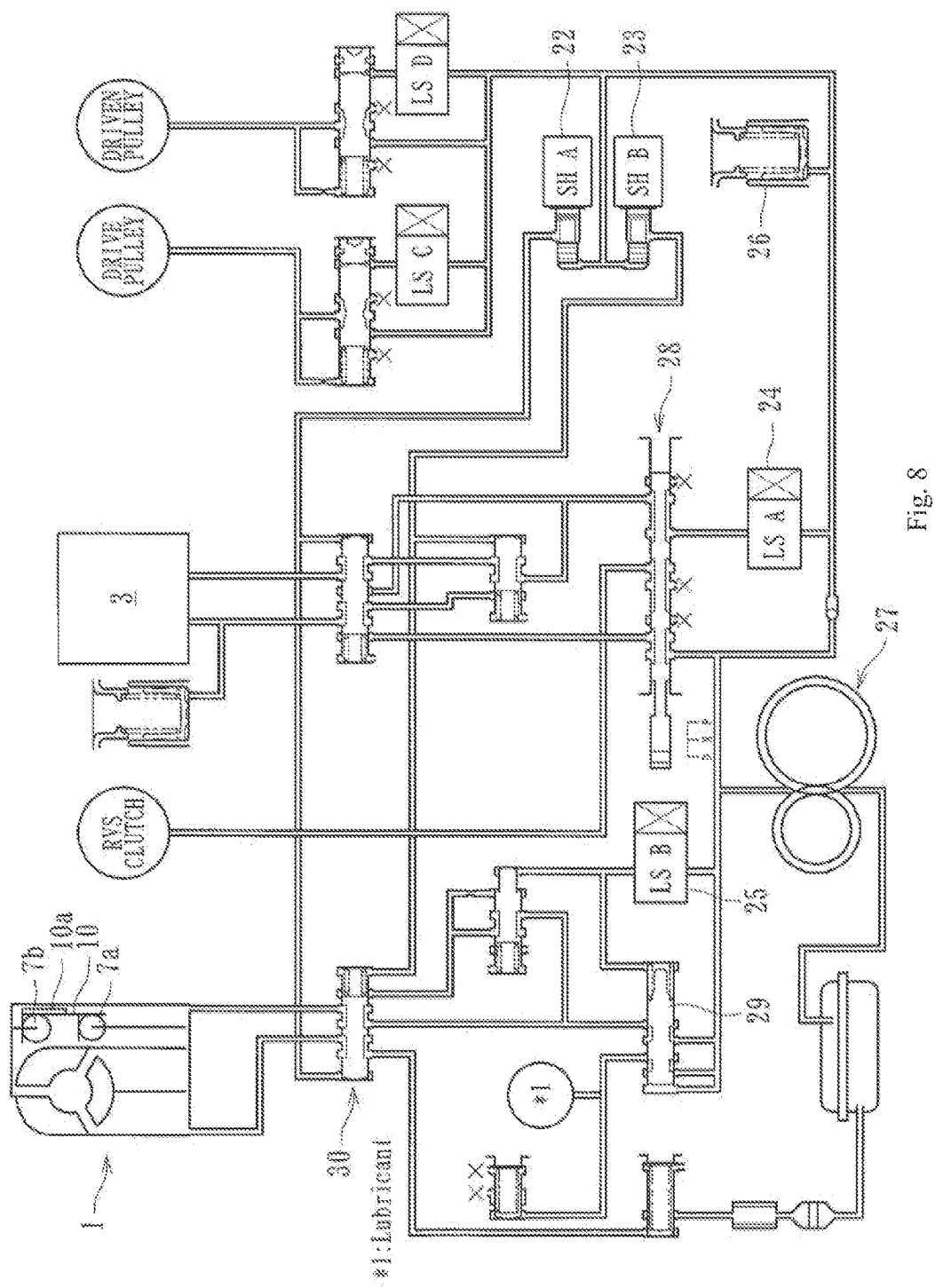
FIG. 8 is a block diagram showing a detailed hydraulic control circuit of the power transmitting apparatus of FIG. 1.

The hydraulic pressure control circuit 21 mainly comprises hydraulic fluid paths and valves for connecting the hydraulic fluid pump 27 and fluid supplying objects (torque converter 1, clutch device 3 etc.) and solenoids for opening and closing the valves, as shown in FIG. 8. A reference numeral 29 denotes a regulator valve for regulating the line pressure, and a reference numeral 25 denotes a linear solenoid (LS B) for controlling the control pressure of the regulator valve 29. A linear solenoid (LS A) 24 can control the clutch pressure of the clutch device 3 in the "D" (drive) range and the clutch pressure of a reverse clutch (RVS CLUTCH) in the "R" (reverse) range and the linear solenoid (LS B) 25 can control the line pressure to be regulated by the regulator valve 29. A reference numeral 26 denotes an accumulator, and a reference numeral 28 denotes a manually operated valve for switching hydraulic fluid paths in accordance with shift ranges ("P," "R," "N," "D") of the transmission A.

According to some embodiments, a hydraulic pressure valve 30 can be connected the flow path (e.g., in some cases, to the middle of the flow path) from the hydraulic fluid pump 27 to the torque converter 1. The hydraulic valve 30 is configured to switch the spring property of the damper mechanism 7 between the low spring rate state and the high spring rate state by actuating the damper clutch (spring property switching device) 10. That is, the damper clutch 10 is separated and switched to the low spring rate state when the hydraulic valve 30 occupies a state shown in FIG. 10B based on the control of the spring property controller 14, and the damper clutch 10 is connected and switched to the high spring rate state when the hydraulic valve 30 occupies a state shown in FIG. 10A.

Figure 12:
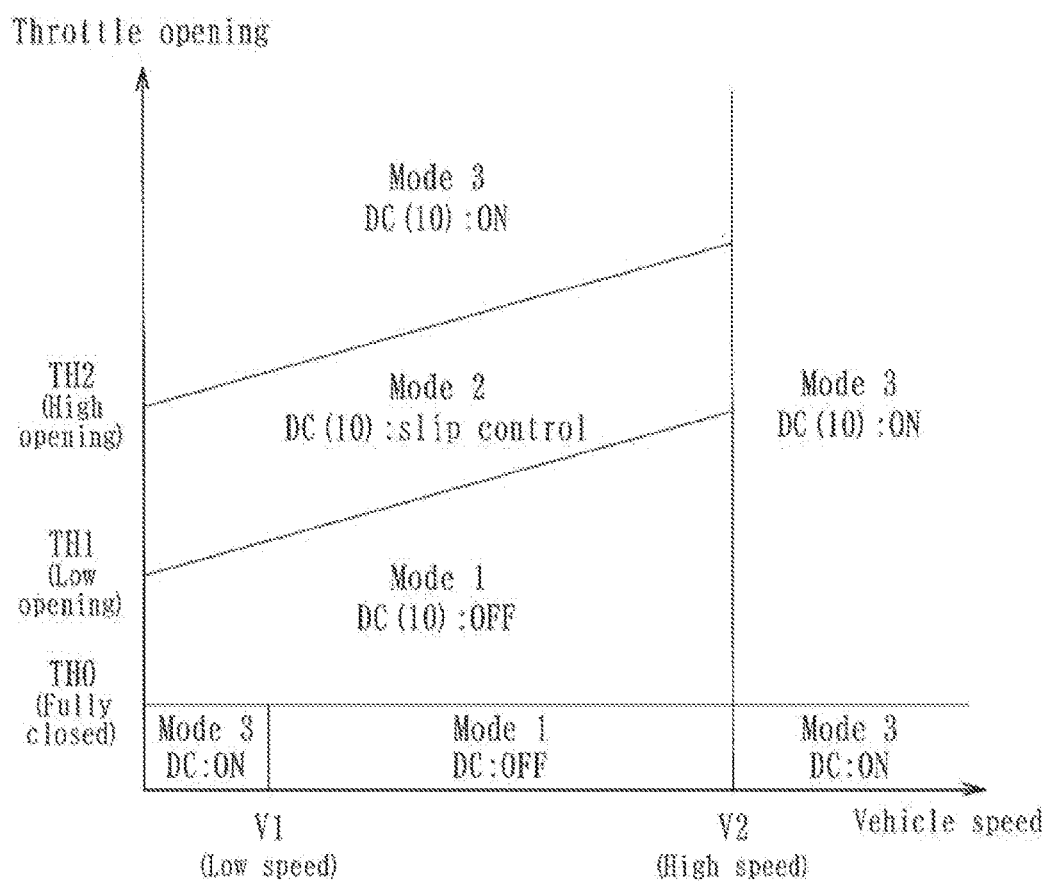
FIG. 12 is a graph showing a control mode of the spring property switching device of the power transmitting apparatus of FIG. 1.

As shown in FIG. 12, the spring property controller 14 can include a predetermined control map including data or circuitry defining a plurality of control modes (e.g., Modes 1-3) corresponding to the running state of the vehicle (the vehicle speed V and throttle opening TH in some embodiments) can refer. According to this control map, a state in which the damper clutch (DC) 10 is OFF is set to Mode 1, a state in which the damper clutch 10 is slip-controlled is set to Mode 2, a state in which the damper clutch 10 is ON is set to Mode 3, and a state in which e.g. the vehicle speed V is above high speed V2 is set to Mode 3 irrespective of the throttle opening TH. In addition, when the vehicle speed V is below high speed V2, a state in which the throttle opening TH is above high throttle opening TH2 is set to Mode 3 and a state in which the throttle opening TH is above low throttle opening TH1 and below high throttle opening TH2 is set to Mode 2. When the throttle opening TH is in a fully closed state, a state in which the vehicle speed V is below low speed V1 is set to Mode 3, and a state in which the vehicle speed V is above low speed V1 and below high speed V2 is set to Mode 1.

As shown in table of FIG. 9, a solenoid (e.g., linear solenoid 24 (LS A) or linear solenoid 25 (LS B)) can be actuated by supplying the solenoid pressure to them by controlling the solenoid 22 (SH A) and the solenoid 23 (SH B) in accordance with the referred modes. In this table, marks "○" denote the solenoids being electrically switched "ON" by supplying with solenoid pressure, and marks "x" denote the solenoids being electrically switched "OFF" by stopping supply of solenoid pressure.

Figure 11:
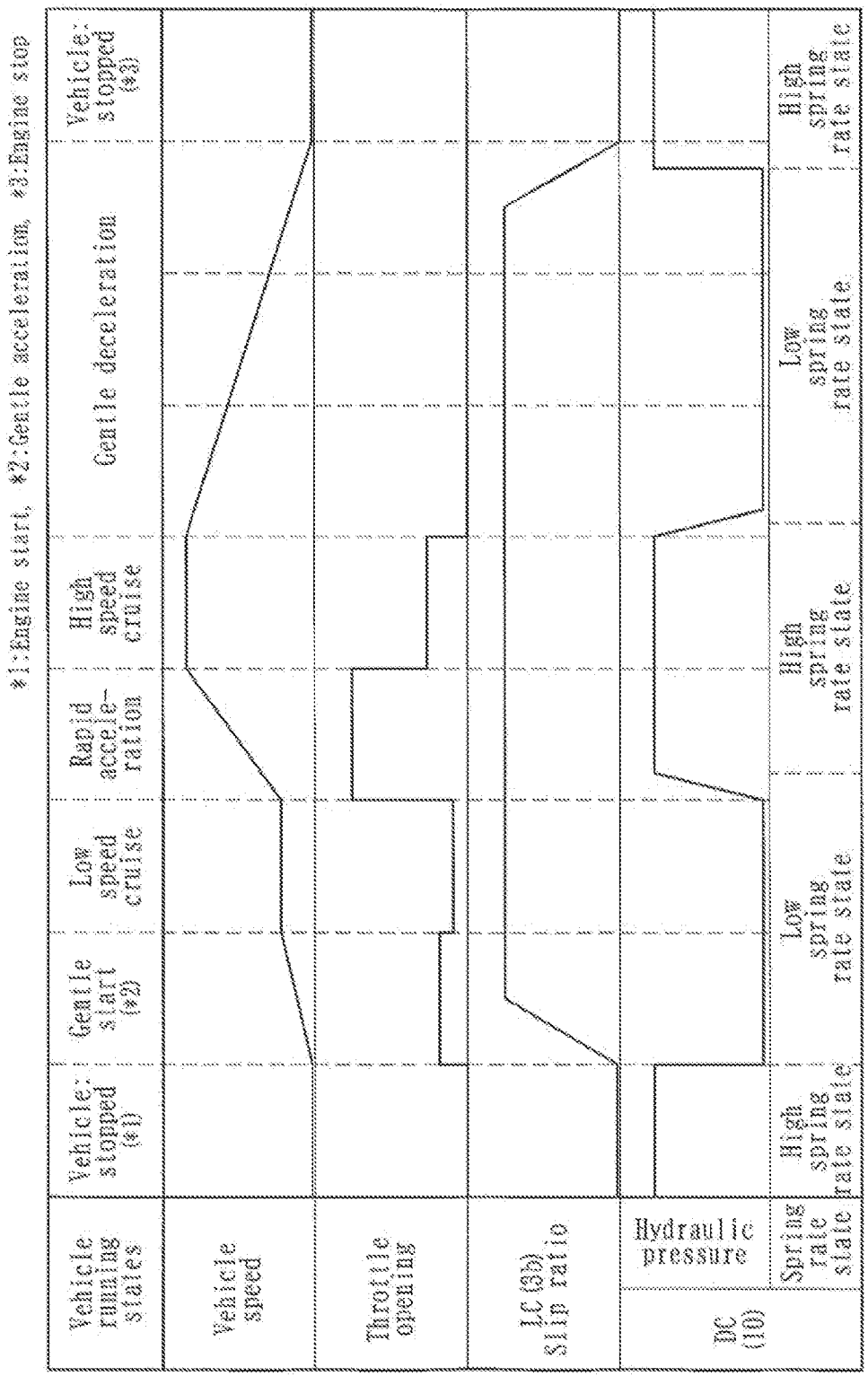
FIG. 11 is a time chart showing operations of the power transmitting apparatus of FIG. 1.

Then, control (i.e. control processes or steps of the spring property controller 14) relative to the damper clutch (DC) 10 depending on the running states of the vehicle are described with reference to a time chart shown in FIG. 11.

First of all, the damper clutch 10 can be held in the connected position and thus in the high spring rate state when the engine is started. That is, for example, the damper clutch 10 can have been held in the connected state and thus in the high spring rate state when the engine had stopped, and accordingly this high spring rate state is still maintained upon subsequent start of the engine E.

In this case, since the hydraulic pump 27 is stopped and the damper clutch 10 does not have a power transmitting capacity when the engine E is in the stopped state, the damper clutch 10 is not in the "high spring rate state," but is, instead, in the "substantially same state as the high spring rate state" although it is in the connected state. That is, since hydraulic pressure is supplied to the hydraulic valve 30 by the accumulator 26 even though the oil pump 27 is stopped when the engine E is stopped, the connected state of the damper clutch 10 can be still held. This can eliminate a necessity of the damper clutch 10 to be switched to the connected state in order to have the high spring rate state on start of the engine E and thus to improves its responsiveness.

Then when the vehicle is gently accelerated (Gentle start (*2)) by gently operating the acceleration pedal (throttle opening), the damper clutch 10 is switched to the separated position and thus the low spring rate state. After this gentle acceleration when the vehicle is held at a substantially constant running speed (Low speed cruise) (i.e. low running speed in a state in which the throttle opening is lower than a predetermined degree), the damper clutch 10 is held in the separated position and thus in the low spring rate state.

Then when the vehicle is rapidly accelerated (Rapid acceleration) by suddenly operating the acceleration pedal, the damper clutch 10 is moved to the connected position and switched to the high spring rate state after the slip control has been performed. Then when the vehicle runs at a substantially constant speed (High speed cruise) (high speed running in which the throttle opening is in higher degree than a predetermined degree), the damper clutch 10 is held in the connected position and the high spring rate state is kept.

Then when the vehicle is gently decelerated (Gentle deceleration) by stopping the acceleration pedal operation, the damper clutch 10 is moved to the separated position and switched to the low spring rate state after the slip control having been performed until the vehicle reaches to a predetermined speed. When the vehicle reaches the predetermined speed, the damper clutch 10 is moved to the connected position and switched to the high spring rate state. According to some embodiments, the damper clutch 10 is controlled so that it is switched to the high spring rate state in a resonance range (e.g., a range in which the vehicle speed is below a low speed V1 in FIG. 12) relative to the engine E in the low spring rate state and switched to the low spring rate state in a resonance range (range in which the vehicle speed is above a low speed V1 and a high speed V2 in FIG. 12) relative to the engine E in the high spring rate state when the vehicle is running in a state in which the engine E is rotating at a speed lower than the idling speed during deceleration of the vehicle.

Figure 13:
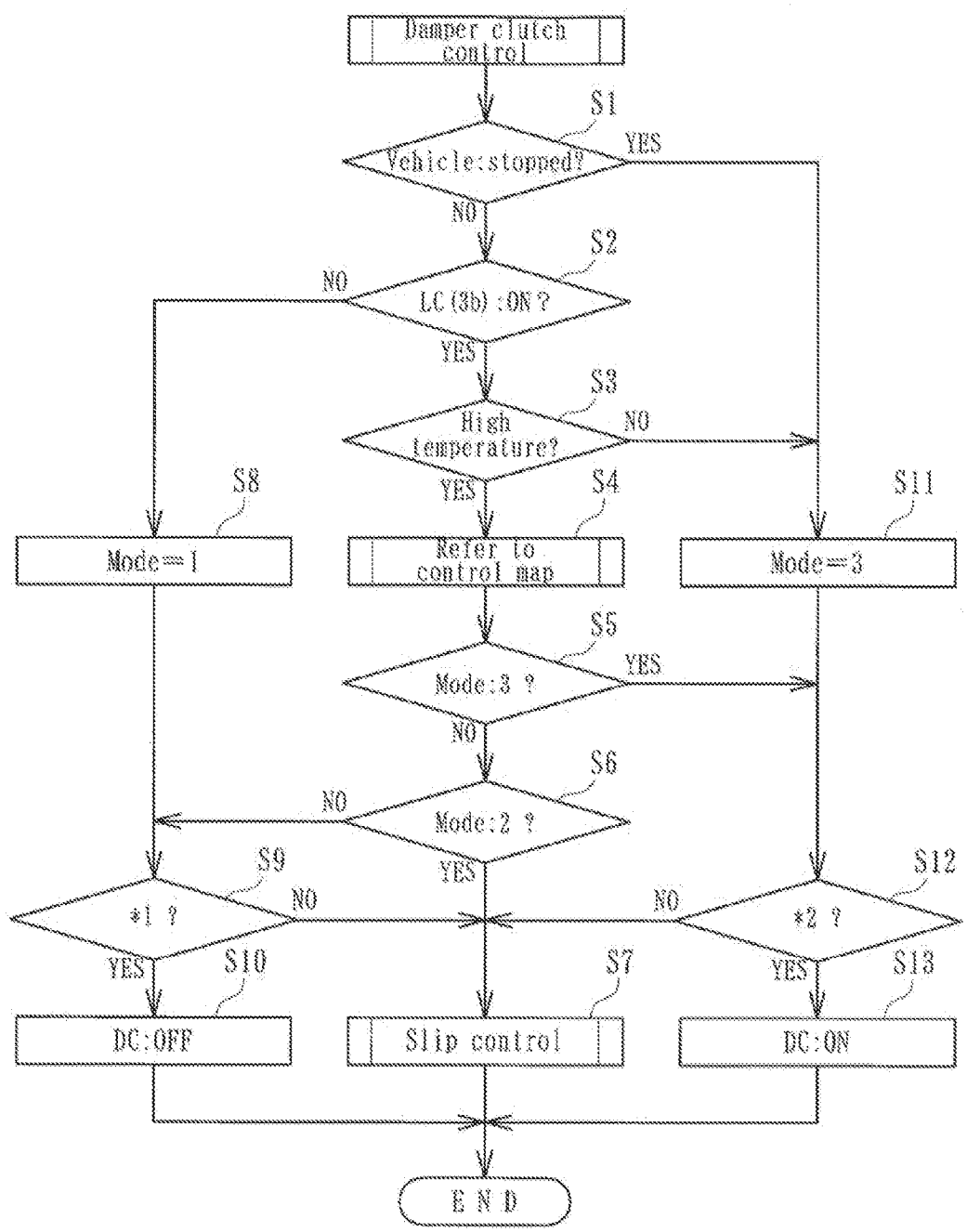
FIG. 13 is a flowchart showing contents of control of the spring property controller of the power transmitting apparatus of FIG. 1.

With reference to a flow chart of FIG. 13, a contents of control of the damper clutch 10 (i.e. contents of control of the spring property controller 14) of some embodiments will be described.

First of all, it is determined whether the vehicle is in a stopped state (S1). When determined that the vehicle is not in a stopped state, the control routine goes to step S2 and determines whether the second clutch device (e.g., lock-up clutch: LC) 3b is actuated (i.e. whether it is in the second power transmitting system in which the driving power of the engine E is transmitted to the wheels D without transferring power through the torque converter 1). When the second clutch device 3b is actuated and it is in the second power transmitting system, the control routine goes to step S3 and determines whether the temperature of hydraulic fluid is higher than a predetermined value.

When it is determined that temperature of hydraulic fluid is higher than a predetermined value at step S3, the control routine goes to step S4 and refers to the control map of FIG. 12. That is, the damper clutch 10 is switched between the high spring rate state and the low spring rate state depending on the running state of the vehicle. As a result of the reference to the control map, a determination whether the damper clutch 10 should be set to Mode 3 (S5) or a determination whether it should be set to the Mode 2 (S6) is sequentially performed. When determined that the damper clutch 10 should be set to Mode 2 at step S6, the control routine goes to step S7 and performs a control of Mode 2 (i.e. the slip control).

On the other hand, as a result of the reference to the control map, when the control routine determines that the damper clutch 10 should be set to Mode 3 at step S5, the control routine goes to step S12 in which it is determined whether a predetermined time has passed from Mode 1. When it is determined that a predetermined time has passed, the control routine goes to step S13 and actuates the damper clutch 10 in accordance with the setting of the Mode 3 (i.e. moves the damper clutch 10 to the connected position) to obtain the high spring rate state. When it is determined at step S12 that a predetermined time has not passed from Mode 1 (i.e. a predetermined time has not passed from a change of running state of the vehicle), the control routine goes to step S7 and performs the control of Mode 2 (slip control).

As a result of the reference to the control map, when the control routine determines that the damper clutch 10 should not be set to Mode 2 at step S6, the control routine goes to step S9 in which it is determined whether a predetermined time has passed from Mode 3. When it is determined that a predetermined time has passed, the control routine goes to step S10 and does not actuate the damper clutch 10 in accordance with the setting of the Mode 1 (i.e. moves the damper clutch 10 to the separated position) to obtain the low spring rate state. When it is determined at step S9 that a predetermined time has not passed from Mode 3 (i.e. a predetermined time has not passed from a change of running state of the vehicle), the control routine goes to step S7 and performs the control of Mode 2 (slip control).

When the control routine determines at step S2 that the second clutch device 3b is not actuated and is in the first power transmitting system, the control routine goes to step S8 without referring to the control map and steps S9, S10 are sequentially performed after setting of Mode 1. Similarly, when the control routine determines that the temperature of the hydraulic fluid is lower than the predetermined value at step S3, the control routine goes to S11 without referring to the control map and steps S12, S13 are sequentially performed after Mode 3 has set at step S11.

Figure 14:
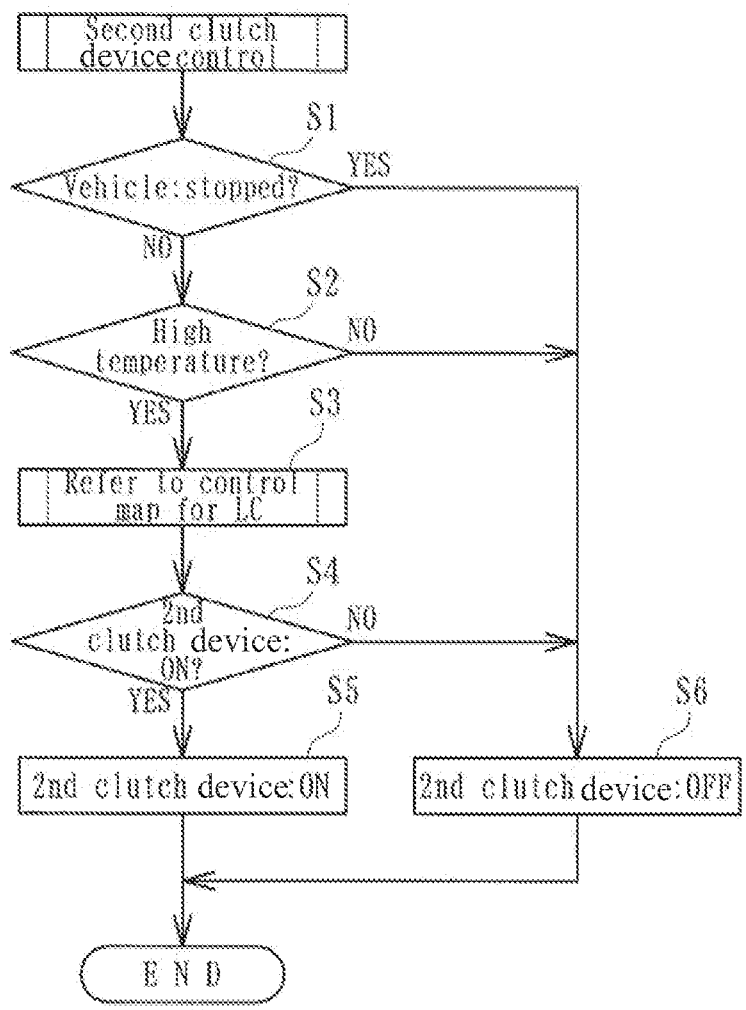
FIG. 14 is a flowchart showing contents of control of a second clutch device of the power transmitting apparatus of FIG. 1.

With reference to the flow chart of FIG. 14, contents of control of the second clutch device (lock-up clutch: LC) 3b of some embodiments will be described.

First of all, the control routine determines whether the vehicle is in a stopped state (S1). When determined that the vehicle is not in a stopped state, the control routine goes to step S2 and determines whether temperature of the hydraulic fluid in the second clutch device 3b is higher than a predetermined value. When determined that the temperature of the hydraulic fluid is higher than the predetermined value, the control routine refers to a control map for the LC (second clutch device 3b) (S3). As a result of the reference to the control map (e.g. control map referable to a control mode in accordance with the running state of the vehicle), when the control routine determines that is the map indicates a control mode for actuating the second clutch device 3b, the control routine goes to step S5 and actuates the second clutch device 3b.

On the other hand, when the control routine determines that the control map indicates a control mode not actuating the second clutch device 3b, the control routine goes to step S6 and turns the second clutch device 3b to a non-actuated state. In step S1, when the control routine determines that the engine is in a started state or an idle-stop state and the vehicle is in a stopped state, or in step S2 when the control routine determines that the temperature of the hydraulic fluid in the second clutch device 3b is not higher than the predetermined value, the control routine goes to step S6 without referring to the control map for the LC (lock-up clutch, i.e. second clutch device) 3b and the control routine turns the second clutch device 3b to the non-actuated state.

Figure 15:
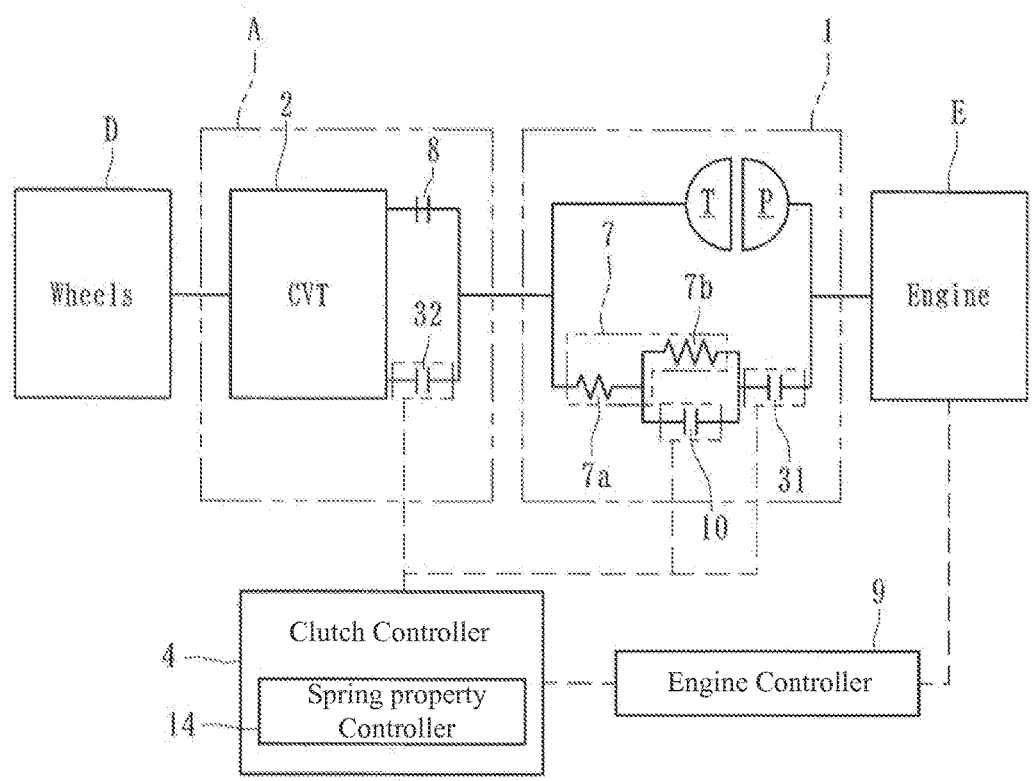
FIG. 15 is a schematic view showing a basic concept of the power transmitting apparatus of a modification of the first embodiment of the present disclosure.

The power transmitting apparatus shown in FIG. 2 may be modified as shown in FIG. 15 to include a clutch device 31 (which can serve as a clutch means) for switching the first and second power transmitting systems. The clutch device 31 (e.g., corresponding to the second clutch device 3b of the first embodiment of FIG. 2) can be arranged within the torque converter 1. In this modification, a separate clutch device 32 (which can serve as a clutch means or separate clutch means) for switching forward and reverse of the vehicle can be arranged within the transmission apparatus A in parallel with the third clutch device 8 at an upstream side of the CVT 2. The arrangement of the clutch device 31 (which can serve as a clutch means) for switching the first and second power transmitting systems within the torque converter 1 can achievement of efficient switching operation between the first and second power transmitting systems and can simplify the external structure of the torque converter 1.

Figure 16:
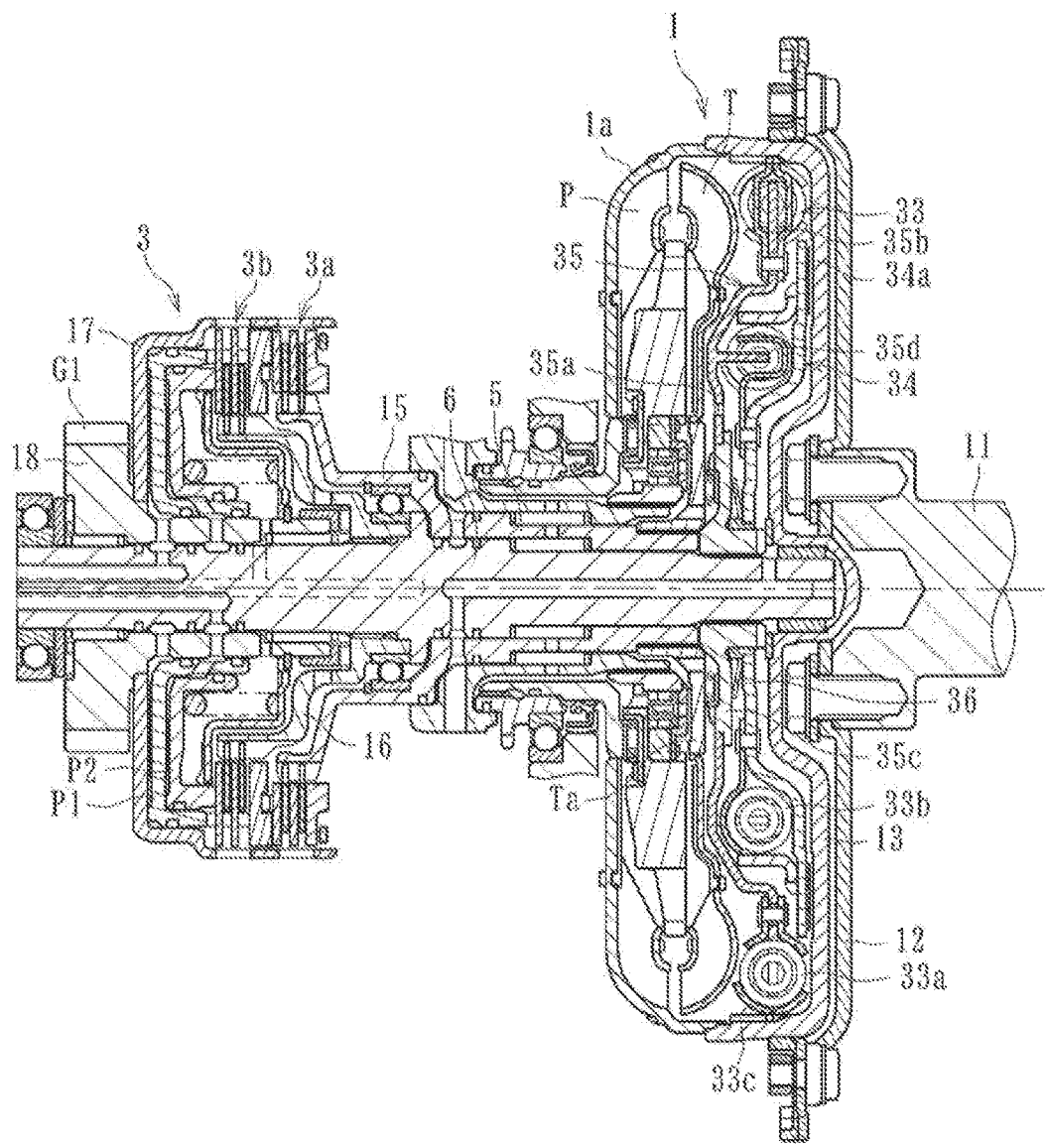
FIG. 16 is a longitudinal section view of a power transmitting apparatus of a second embodiment of the present disclosure.
Figure 17:
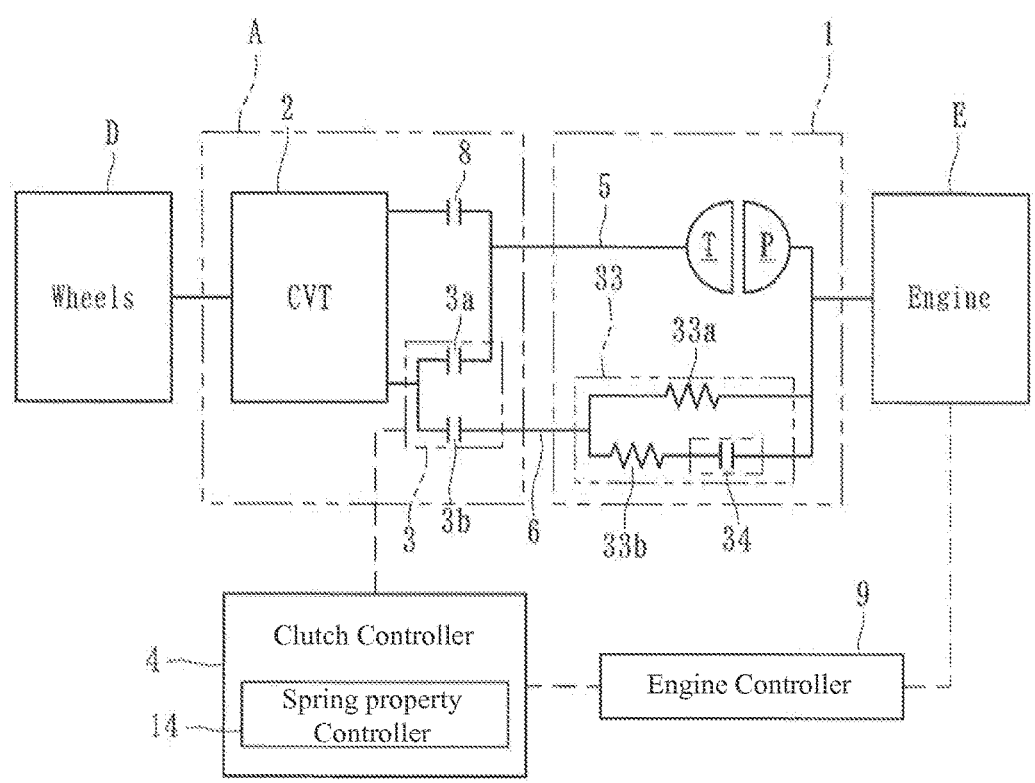
FIG. 17 is a schematic view showing a basic concept of the power transmitting apparatus of FIG. 16.

As illustrated in FIG. 1-18, in some embodiments a power transmitting apparatus can be configured to transmit and cut off the driving power of an engine of an automobile to and from wheels. The power transmitting apparatus can comprise a torque converter 1, a clutch device 3 (which can serve as a clutch means), a damper mechanism 33, a damper clutch 34 as a spring property switching device (which can serve as a spring property switching means), and a spring property controller 14 (which can serve as a spring property control means). FIG. 16 is a longitudinal section view showing a main part of the power transmitting apparatus some embodiments of the present disclosure, and FIG. 17 is a schematic view showing basic concept of the power transmitting apparatus of FIG. 16. Same reference numerals are used in these drawings as those used in previously-described figures for designating same or similar parts of the various embodiments.

As shown in FIG. 17, the damper mechanism 33 can be formed of dampers having spring properties for damping torque variation and can be disposed in the power transmitting system. According to some embodiments, the damper mechanism 33 comprises two dampers, including first damper 33a and a second damper 33b, a damper clutch 34 as a spring property switching device (which can serve as a spring property switching means), and a connecting portion 33c projected radially inward from the inner circumference of the torque converter cover 13.

According to some embodiments, the damper mechanism 33 comprises a holding member 35 configured to hold a first damper 33a and a damper clutch 34 having the second damper 33b. In some embodiments, the power transmitting system comprising the holding member 35 holding the first damper 33a and the power transmitting system comprising the damper clutch 34 are connected in parallel. The holding member 35 can comprise one end 35b connected to the connecting portion 33c via the first damper 33a. The other end 35c can be spline-connected to the outer circumference of the second driving shaft 6, and a connecting portion 35d can be connected to the damper clutch 34 via the second damper 33b.

Thus, the driving torque of the engine E can be transmitted to the CVT 2 with the cover member 12, the torque converter cover 13, the holding member 35 and the second driving shaft 6 being rotated when the input shaft 11 is rotated by the driving power of the engine E (second power transmitting system). Accordingly, in the second power transmitting system, it is possible to transmit the driving power of the engine E to the wheels D via the damper mechanism 33 and the second driving shaft 6 without transmitting power through the torque converter 1 and it is also possible to damp the torque variation due to the spring properties of the first damper 33a and the second damper 33b. The phrase "second power transmitting system for transmitting the driving power of the engine E to the wheels D without via the torque converter 1" in the present disclosure can be considered as meaning a driving power transmitting system comprising the torque converter cover 13, the holding member 35 and the second driving shaft 6.

As described above, the first driving shaft 5 can be rotated by the driving power of the engine E via the driving transmission system of the torque converter 1 and can be connected to the first clutch device 3a. On the other hand, the second driving shaft 6 can be rotated by the driving power of the engine E without transferring power through the driving transmission system of the torque converter 1 and can be connected to the second clutch device 3b. In some embodiments, the first driving shaft 5 is formed of a hollow cylindrical member and the second driving shaft 6 is rotationally arranged within the first driving shaft 5 coaxially therewith. Accordingly, the first driving shaft 5 and the second driving shaft 6 can be rotated separately and independently of each other by selectively actuating the clutch device 3.

Figure 18:
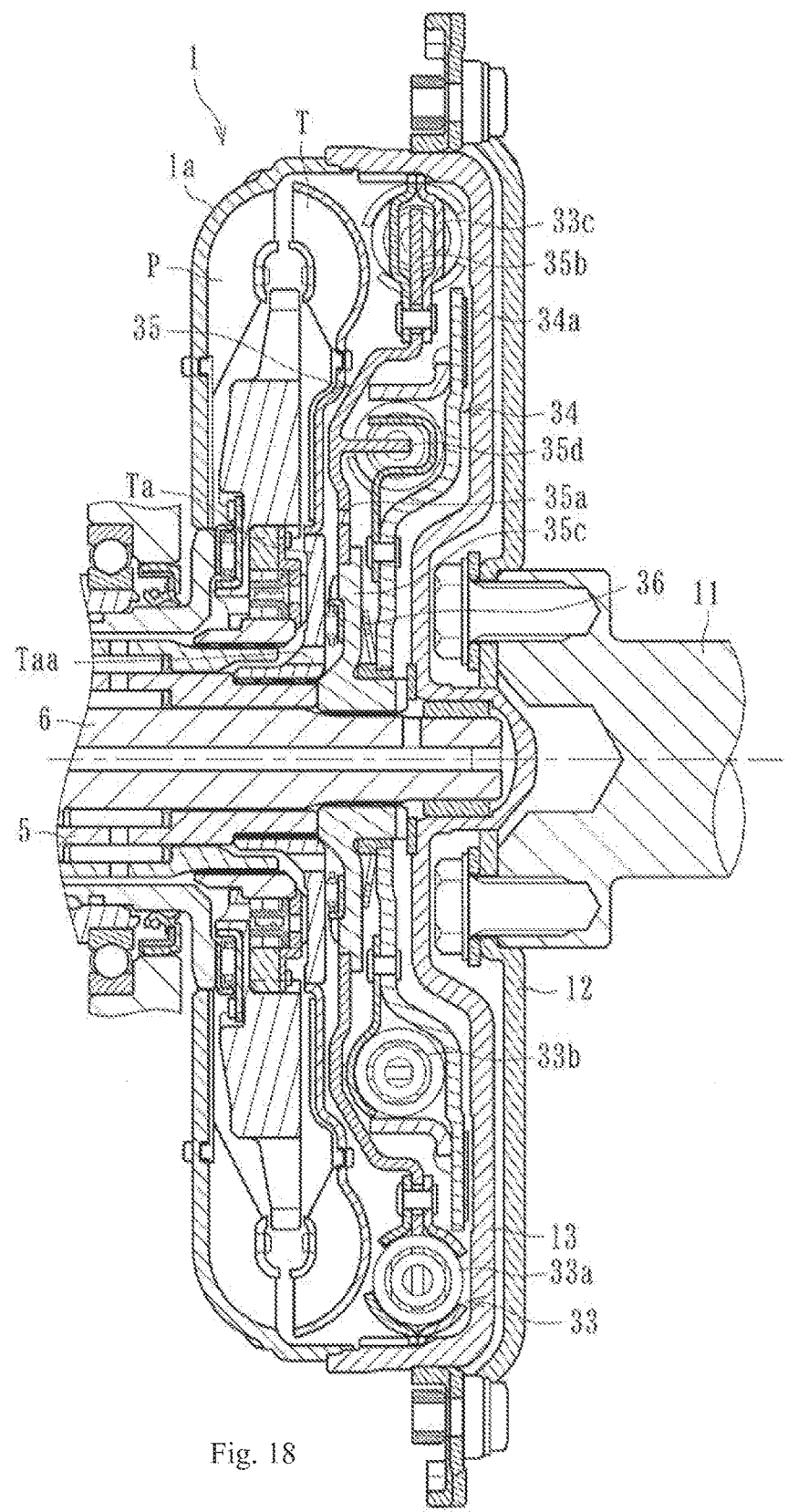
FIG. 18 is an enlarged longitudinal section view showing an internal structure of a torque converter of the power transmitting apparatus of FIG. 16.

A damper clutch (spring property switching device) 34 (which can be considered to serve as a spring property switching means) comprises a frictional member 34a mounted on its outer circumference. In some embodiments, the second damper 33b connected to the holding member 35 via a connecting portion 35d is held at a predetermined position as shown in FIG. 18. The damper clutch 34 can be moved between a connected position (FIG. 22A) in which the frictional member 34a is contacted with the inside surface of the torque converter cover 13, and a separated position (FIG. 22B) in which the frictional member 34a is separated from the inside surface of the torque converter cover 13. That is, as shown in FIG. 22, hydraulic fluid supplied from a hydraulic valve 30 acts on the front side of the damper clutch 34 and moves the damper clutch 34 toward a direction α (FIG. 22A) and thus the damper clutch 34 is switched from the separated position to the connected position. On the other hand, when the hydraulic fluid supplied from the hydraulic valve 30 acts on the back side of the damper clutch 34, the damper clutch 34 is moved to a direction β (FIG. 22B) and thus switched from the connected position to the separated position.

More particularly, the hydraulic valve 30 comprises a piston member 30a normally urged toward a direction of an arrow "b" in FIG. 22B by a spring "sp" and thus the hydraulic fluid supplied to the damper clutch 34 can be circulated at the time of non-operation of a solenoid 22 (SH A) (FIG. 21) and can act on the back side of the damper clutch 34 to move the damper clutch 34 to the separated position. On the other hand, when the hydraulic fluid is supplied from the solenoid 22 (SH A) to the hydraulic valve 30, the piston member 30a is moved toward a direction of an arrow "a" in FIG. 22A against the urging force of the spring "sp," and thus the hydraulic fluid acts on the front side of the damper clutch 34 to move the damper clutch 34 to the connected position.

When the damper clutch 34 is in the connected position, since the driving power is transmitted from the torque converter cover 13 to the damper clutch 34 via the frictional member 34a, the driving power can be transmitted to the holding member 35 via the second damper 33b and the connecting portion 35d and the remained driving power not transmitted by the damper clutch 34 can be transmitted from the torque converter cover 13 to the holding member 35 to rotate the second driving shaft 6 via the connecting portion 33c and the first damper 33a. When the torque is varied during rotation of the second driving shaft 6, the torque variation can be damped by both the first damper 33a and the second damper 33b.

On the other hand, when the damper clutch 34 is in the separated position, since the driving power is transmitted from the torque converter cover 13 to the holding member 35 via the connecting portion 33c and the first damper 33a to rotate the second driving shaft 6, it is possible to damp torque variation exclusively by the first damper 33a if torque variation would be caused during rotation of the second driving shaft 6.

Figure 19:
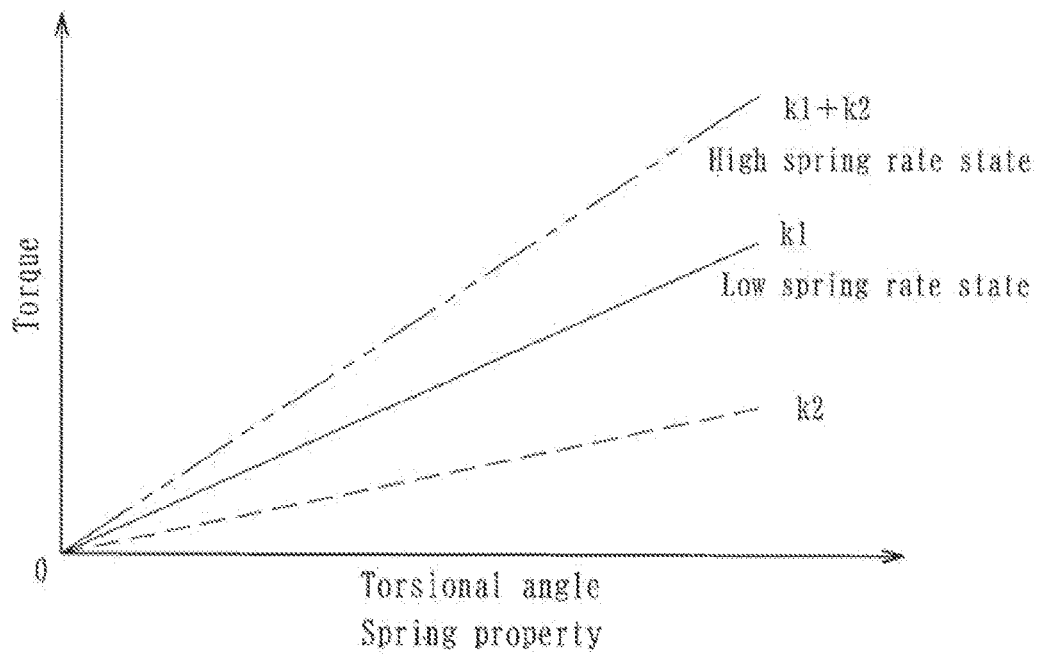
FIG. 19 is a graph showing the spring property of a damper mechanism of the power transmitting apparatus of FIG. 16.

Accordingly, as shown in FIG. 19, when the damper clutch 34 is in the separated position, it is possible to set the second power transmitting system to a low spring rate state (i.e. state of the whole spring constant being expressed as k1 wherein k1 is the spring constant of the first damper 33a) by connecting only the first damper 33a to the second power transmitting system. It can also be possible, when the damper clutch 34 is in the connected position, to set the second power transmitting system to a high spring rate state (i.e. state of the whole spring constant being expressed as (k1+k2), wherein k1 and k2 are the spring constants of the first and second dampers 33a and 33b, respectively) by connecting the first damper 33a and the second damper 33b to the second power transmitting system in parallel. In the graph of FIG. 19, the ordinate shows a torque and the abscissa shows a torsional angle of the torque converter 13 relative to the second driving shaft 6 (i.e. a displacement of the first and second dampers 33a, 33b in the compressive direction).

According to some embodiments, the first damper 33a can be arranged at an overlapped position radially outward from the outer circumference of the spring property switching device 34 as shown in FIG. 18. That is, according to some embodiments, since the power transmitting system including the first damper 33a and the power transmitting system including the second damper 33b and the damper clutch 34 are connected in parallel to each other, it is possible to reduce the torque applied to the damper clutch 34 in the high spring rate state and thus to reduce the size or capacity of the damper clutch 34. Accordingly, since it is possible to reduce the radial dimension of the damper clutch 34, it is possible to arrange the first damper 33a in the corresponding space (e.g., space radially outer of the damper clutch 34) and thus to use a first damper 33a having a larger radial dimension.

In some embodiments, the power transmitting apparatus comprises an urging device 36 (e.g., Belleville spring), which can serve as an urging means. The urging device can be configured to urge the spring property switching device (damper clutch) 34 toward the connection state as shown in FIG. 18. That is, the Belleville spring 36 is interposed between the holding member 35 and the damper clutch 34 so that one end of the Belleville spring 36 is abutted against the holding member 35 and the other end is abutted against the damper clutch 34 to urge the damper clutch 34 so that the frictional member 34a contacts the inner wall of the torque converter 13. This can improve the response of the damper clutch (spring property switching device) 34. In some embodiments, other well-known urging means (e.g. coil spring etc.) may be used in place of the Belleville spring.

According to some embodiments, an output member Ta of the turbine T of the torque converter 1 can be formed with through apertures Taa through which operating fluid for actuating the spring property switching device (damper clutch) 34 can flow, and a holding member 35 holding the first damper 33a can be formed with through apertures 35a through which operating fluid for actuating the spring property switching device (damper clutch) 34 can flow as shown in FIG. 18. This can improve the response of the damper clutch (spring property switching device) 34. In some embodiments, it may be possible to form only the through apertures Taa of the output member Ta without forming the through apertures 35a of the holding member 35.

In some embodiments, the spring property controller 14 is included in the clutch controller 4 and is intended to obtain the spring property depending on the running state by actuating the spring property switching device (damper clutch) 34 in accordance with the running state of the vehicle. That is, since the clutch controller 4 can be configured to identify the running state of the vehicle from signals from the engine controller (ECU) 9, it is possible to switch the low spring rate state (state in which only the first damper 33a is connected with a predetermined portion of the second power transmitting system being cut off by the damper clutch 34) and the high spring rate state (state in which the first damper 33a and the second damper 33b are connected in parallel to the second power transmitting system with a predetermined portion of the second power transmitting system being connected by the damper clutch 34) by actuating the damper clutch 34 in accordance with signals depending on the running state and cutting off or connection of the predetermined portion (i.e. portion in which the damper clutch 34 is arranged in the second power transmitting system).

Specifically, when the vehicle is in a running state in which the engine E rotates at a rotational speed lower than an idle speed during the vehicle is in the deceleration state, the spring property controller 14 can be configured to switch a spring rate to the high spring rate state at a range resonating with the engine E in the low spring rate state and also to switch a spring rate to the low spring rate state at a range resonating with the engine E in the high spring rate state.

In some embodiments, it is possible (e.g., as a result of the above-described control) to avoid generation of resonation even when the vehicle is in a running state in which the engine E rotates at a rotational speed lower than an idle speed during the vehicle is in the deceleration state and thus to more appropriately hold the state of the second power transmitting system. Especially in a vehicle in which energy regeneration is performed e.g. using an alternator during deceleration of the vehicle, it is possible to hold the state of the second power transmitting system even in an engine speed range lower than the idling speed and thus to perform the energy regeneration over a wider rotational engine speed.

In addition, when the vehicle is in a running state in which a running speed of the vehicle is held in substantially constant at a throttle opening smaller than a predetermined opening or in a running state in which the vehicle is accelerated more gently than a predetermined degree, it can be controlled that the spring property controller 14 switches a spring rate to the low spring rate state by moving the damper clutch 34 to the separated position. This makes it possible to better prevent generation of stayed sound even when the vehicle is in a running state in which a running speed of the vehicle is held in substantially constant at a throttle opening smaller than a predetermined opening or in a running state in which the vehicle is accelerated more gently than a predetermined degree and thus to more appropriately hold the state of the second power transmitting system.

Furthermore, the spring property controller 14 of the present embodiment can be configured to control the damper clutch 34 so that it is switched to the high spring rate state of the connected position when the vehicle in a running state in which the vehicle is more rapidly accelerated than a predetermined degree. This makes it possible to surely prevent generation of a repeating phenomenon of rickety vibration (so-called "jerk" phenomenon) caused during acceleration or deceleration of the vehicle and thus to hold the second power transmitting system in a more appropriate condition.

In addition, the spring property controller 14 can be configured to switch a spring rate to the high spring rate state when the engine E is stopped and to hold the high spring rate state when the engine E is started. This can make it possible to better prevent generation of resonation of the second power transmitting system when the engine E is started. That is, since the resonation tends to be caused in high engine speed range at a high spring rate state than a low spring rate state, the resonation can be prevented by shifting to the high spring rate state during start of the engine E.

Furthermore, the damper clutch 34 of some embodiments of the present disclosure can be slip-controlled during the switching process for cutting off and connecting the predetermined portion of the second power transmitting system (i.e. during switching process from the separated state to the connected state). That is, capacity control (control of the power transmitting capacity) can be achieved by slipping the frictional member 34a relative to the torque converter cover 13 by adjusting a pressing force of the frictional member 34a against the inner wall surface of the torque converter cover 13).

According some embodiments, since the power transmitting apparatus comprises a spring property switching means 34 for arbitrarily switching spring properties of the damper mechanism 33, and a spring property controller 14 for switching the spring properties according to the running state of the vehicle by actuating the spring property switching means 34 based on the running state of the vehicle, it is possible to hold the state of the second power transmitting system over a wider engine speed range and thus to further improve the fuel consumption.

In addition, since the damper mechanism 33 of some embodiments comprises two dampers, including the first damper 33a and the second damper 33b, and the spring constant of the damper mechanism 33 can be configured to switch between a low spring rate state and a high spring rate state by arbitrarily and selectively connecting the first damper 33a and the second damper 33b by the spring property switching device 34, it is possible to more appropriately and smoothly switch the spring property of the damper mechanism depending on running state.

Furthermore according to some embodiments, since the damper mechanism 33 is formed of a connection in which the power transmitting system having the first damper 33a and the power transmitting system having the second damper 33b and the spring property switching means 34 are connected in parallel to each other, and a shift from the low spring rate state to the high spring rate state can be attained by switching the spring property switching device 34 to the connected state, it is possible to configured the first damper 33a and the second damper 33b to share the torque in the high spring rate state and thus to reduce torque applied to the damper clutch (spring property switching device) 34 in the high spring rate state and thus to use a smaller spring property switching device 34.

Furthermore according to some embodiments, since the spring property switching device 34 comprises a damper clutch 34 for cutting off or connecting a predetermined portion of the second power transmitting system in accordance with a signal from the spring property controller 14, it is possible to more surely and smoothly switch the spring property of the damper mechanism 33. In addition, since the damper clutch 34 can be slip-controlled during the switching process for cutting off and connecting the predetermined portion of the second power transmitting system, it is possible to more smoothly switch the spring property of the damper mechanism 33.

In addition, similarly to the first embodiment, since the spring property controller 14 holds a predetermined control map (FIG. 12) capable of referring to a control mode depending on a running state of the vehicle and can control the spring property switching device (damper clutch) 34 in accordance with the control mode of the control map, it is possible to more smoothly and appropriately switch the spring property of the damper mechanism 33. More particularly, since the spring property controller 14 can be configured to refer to the control map only when the temperature of operating oil of the damper clutch 34 is higher than a predetermined value, it is possible to prohibit the control according to the control map when the temperature of operating oil of the damper clutch is lower than a predetermined value (i.e. when it is more likely that operation of the damper clutch 34 would not be smoothly performed).

In addition, since the damper clutch 34 is disposed within the torque converter 1 (i.e. within the torque converter cover 13), it is possible to arbitrarily and efficiently switch the spring property of the damper mechanism 33 and to simplify an outside structure of the torque converter 1. In addition, as shown in FIG. 17, since the transmission apparatus A including the torque converter 1 and a transmission unit 2 is disposed in the power transmission path of the power transmitting system from the engine E to the wheel D, the clutch device 3 is disposed within the transmission apparatus A, the transmission unit 2 is the automatic transmission, and the automatic transmission is a CVT (Continuously Variable Transmission) 2, it is possible to apply the power transmitting apparatuses of the present disclosure to vehicles provided with a transmission apparatus including the torque converter and the transmission unit, the transmission unit being an automatic transmission and the automatic transmission being the CVT.

In addition, according to the power transmitting apparatus of some embodiments, since they apparatus comprises a clutch controller 4 for switching the power transmitting system between the first power transmitting system in which the driving power of the engine E is transmitted to the wheels D via the torque converter 1 and the second power transmitting system in which the driving power of the engine E is transmitted to the wheels D without transferring power through the torque converter 1 by arbitrarily and selectively actuating the first clutch device 3a or the second clutch device 3b in accordance with the running state of the vehicle, it is possible to reduce the complication and enlargement of the power transmitting apparatus, and to improve the starting performance of the vehicle by using the torque amplifying function of the torque converter 1 as well as the power transmitting efficiency during the steady running of vehicle.

Furthermore, since the first driving shaft 5 and the second driving shaft 6 are coaxially arranged each other, it is possible to reduce a whole size of the power transmitting apparatus as compared with a structure in which the first and second driving shafts are arranged in parallel to each other. In addition, since the second driving shaft 6 is connected to the engine E via the damper mechanism 33 capable of damping the torque variation, it is possible to damp the vibration of the engine E transmitted to the second clutch device 3b.

Figure 20:
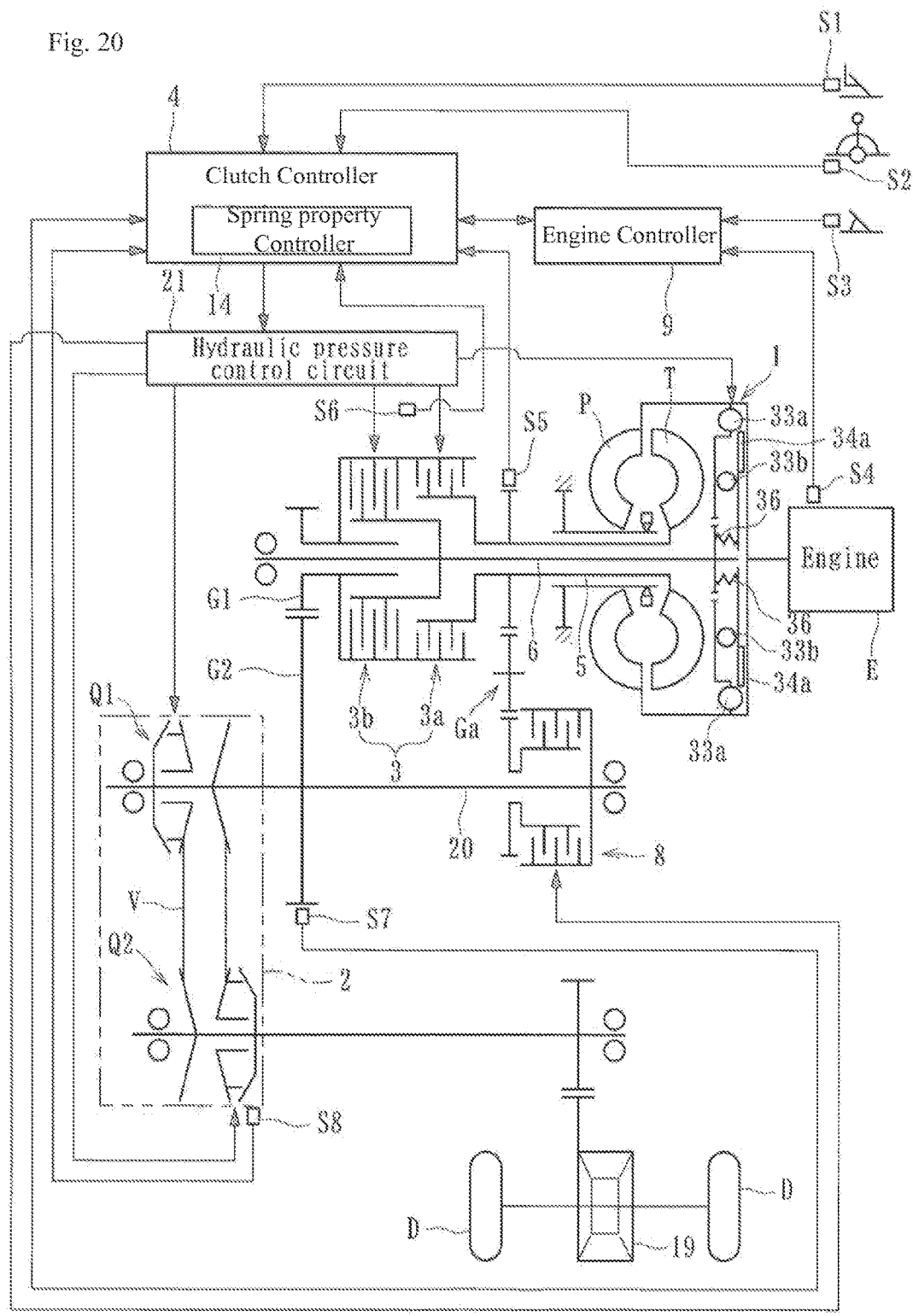
FIG. 20 is a schematic view showing a whole arrangement of the power transmitting apparatus of FIG. 16 including a continuously variable transmission (CVT)

In some embodiments, the automatic transmission of the present disclosure is a so-called CVT which is, as shown in FIG. 20, arranged in the power transmission path of the power transmitting system from the power source (engine E) of the vehicle to the driving wheels (wheels D) and between the second clutch device 3b of the clutch device 3 and the wheels D.

The CVT 2 can comprise two pulleys Q1, Q2 and a belt V extending between the pulleys Q1, Q2 and can be configured such that movable sheaves of the pulleys Q1, Q2 are independently actuated by a hydraulic pressure control circuit 21 for controlling the pressure of hydraulic fluid fed from an oil pump 27 (FIG. 21) to vary the belt-running diameters of the pulleys Q1, Q2 to obtain desirable running speeds of the vehicle. The hydraulic pressure control circuit 21 can be electrically connected to the clutch controller 4 further electrically connected to a brake switch S1, a position sensor S2 of a shift lever, an engine controller 9 etc. A reference numeral S3 denotes a throttle opening sensor of an acceleration pedal of the vehicle.

As described above, since the CVT 2 is arranged in the power transmission path of the power transmitting system from the engine E of the vehicle to the wheels D and between the second clutch device 3b of the clutch device 3 and the wheels D, it is possible to let the clutch for advancing the vehicle double as the clutch for transmitting the driving power of the engine E to the wheels D without transferring power through the driving transmission system of the torque converter 1 in the second clutch device 3b. A reference numeral 19 in FIG. 20 denoted a differential gear of the vehicle. Furthermore, a referential numeral S4 denotes an engine speed sensor for detecting speed of the engine E, a numeral S5 denotes a speed sensor for detecting rotational speed of the first driving shaft 5, a numeral S6 denotes a hydraulic pressure switch for detecting hydraulic pressure of the clutch device 3 (second clutch device 3b in the illustrated embodiment), a numeral S7 denotes a sensor for detecting rotational speed of the second driving shaft 6, and a numeral S8 denotes a sensor for detecting rotational speed of the counter shaft.

The clutch controller 4 of some embodiments can comprise the spring property controller 14 and the damper clutch (spring property switching device) 34 and can be actuated via the hydraulic pressure control circuit 21 under control of the spring property controller 14. The clutch controller 4 and the spring property controller 14 are electrically connected to the engine controller (ECU) 9 and are configured to receive electric signals exhibiting the running state of the vehicle from the ECU 9. Accordingly, the spring property controller 14 can actuate the damper clutch 34 at arbitral timing in accordance with the running state of the vehicle based on the received electric signals.

Figure 21:
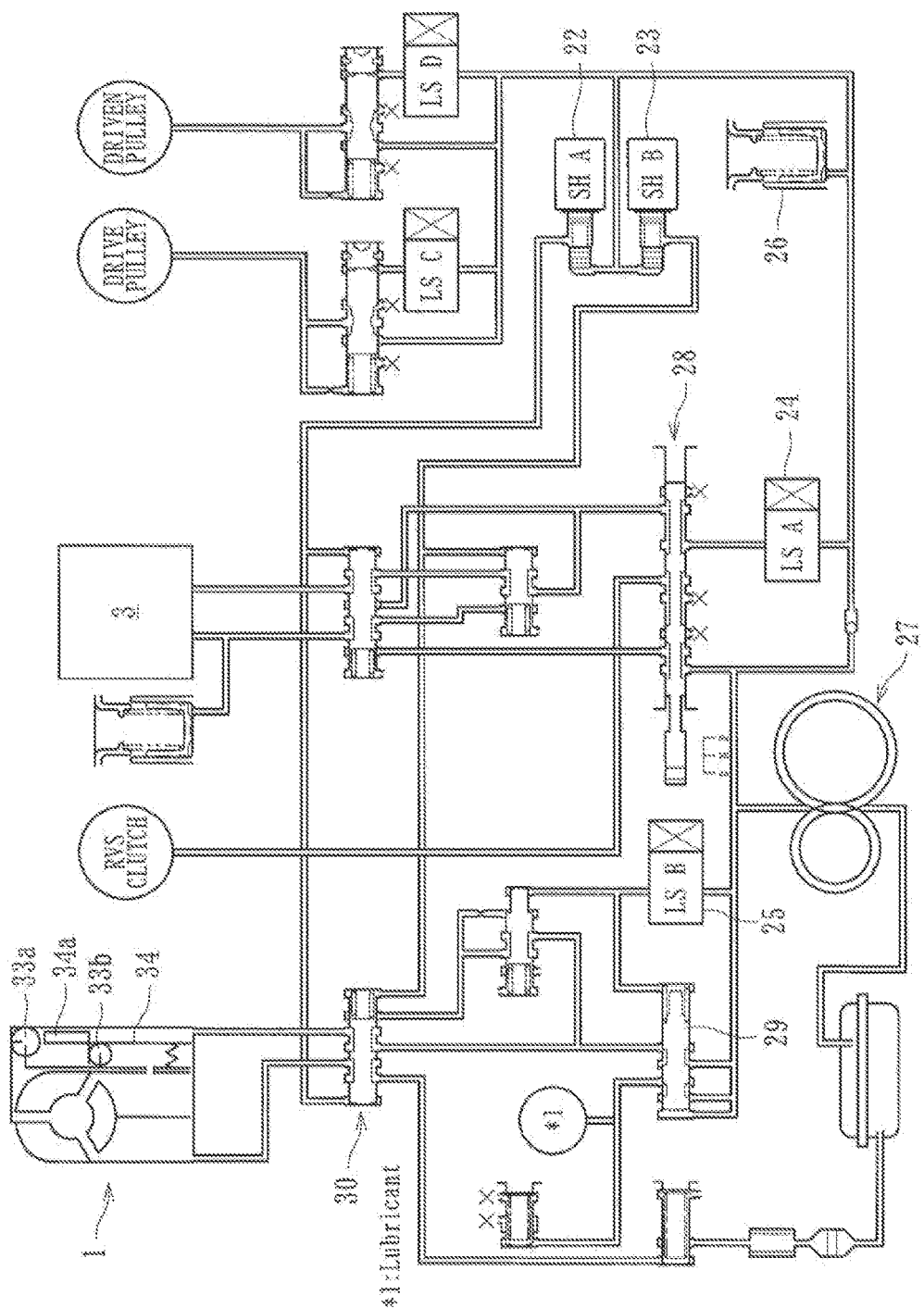
FIG. 21 is a block diagram showing a detailed hydraulic control circuit of the power transmitting apparatus of FIG. 16.

With reference to FIG. 21, the hydraulic pressure control circuit 21 mainly comprises hydraulic fluid paths and valves configured to connect the hydraulic fluid pump 27 and fluid supplying objects (torque converter 1, clutch device 3 etc.) and solenoids configured to open and close the valves as shown in FIG. 21. A reference numeral 29 denotes a regulator valve configured to regulate the line pressure, and a reference numeral 25 denotes a linear solenoid (LS B) configured to control the control pressure of the regulator valve 29. A linear solenoid (LS A) 24 can be configured to control the clutch pressure of the clutch device 3 in the "D" (drive) range and the clutch pressure of a reverse clutch (RVS CLUTCH) in the "R" (reverse) range and the linear solenoid (LS B) 25 can be configured to control the line pressure to be regulated by the regulator valve 29. A reference numeral 26 denotes an accumulator, and a reference numeral 28 denotes a manually operated valve configured to switch hydraulic fluid paths in accordance with shift ranges ("P," "R," "N," "D") of the transmission A.

According to some embodiments, a hydraulic pressure valve 30 is connected to the flow path (e.g., in some configurations, to the middle of the flow path) from the hydraulic fluid pump 27 to the torque converter 1. The hydraulic valve 30 is configured to switch the spring property of the damper mechanism 33 between the low spring rate state and the high spring rate state b actuating the damper clutch (spring property switching device) 34. That is, the damper clutch 34 is configured to separate and switch to the low spring rate state when the hydraulic valve 30 occupies a state shown in FIG. 22B based on the control of the spring property controller 14, and the damper clutch 34 is configured to connect and switch to the high spring rate state when the hydraulic valve 30 occupies a state shown in FIG. 22A.

As shown in FIG. 12, the spring property controller 14 holds a predetermined control map to which control modes (Modes 1-3) corresponding to the running state of the vehicle (the vehicle speed V and throttle opening TH in some embodiments) can refer. According to this control map, a state in which the damper clutch 34 is OFF is set to Mode 1, a state in which the damper clutch 34 is slip-controlled is set to Mode 2, a state in which the damper clutch 34 is ON is set to Mode 3, and a state in which e.g. the vehicle speed V is above high speed V2 is set to Mode 3 irrespective of the throttle opening TH. In addition, when the vehicle speed V is below high speed V2, a state in which the throttle opening TH is above high throttle opening TH2 is set to Mode 3 and a state in which the throttle opening TH is above low throttle opening TH1 and below high throttle opening TH2 is set to Mode 2, as well as when the throttle opening TH is in fully closed state, a state in which the vehicle speed V is below low speed V1 is set to Mode 3, and a state in which the vehicle speed V is above low speed V1 and below high speed V2 is set to Mode 1. As shown in table of FIG. 9, an arbitral solenoid (linear solenoid 24 (LS A) or linear solenoid 25 (LS B)) can be actuated by supplying the solenoid pressure to them with controlling the solenoid 22 (SH A) and the solenoid 23 (SH B) in accordance with the referred modes.

Figure 23:
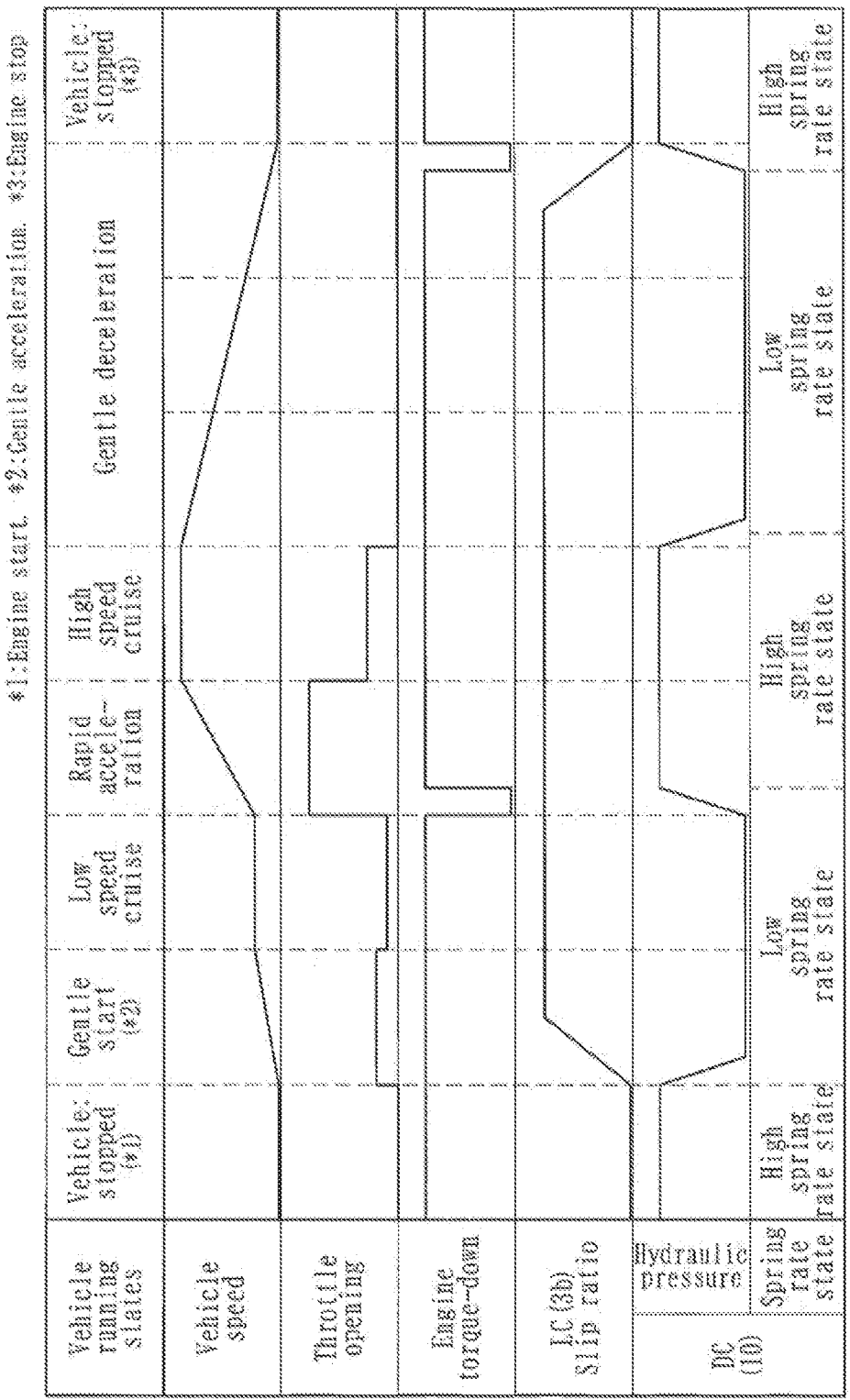
FIG. 23 is a time chart showing operations of the power transmitting apparatus of FIG. 16.

Referencing FIG. 23, contents of control (i.e. control contents of the spring property controller 14) relative to the damper clutch 34 depending on the running states of the vehicle of some embodiments will be described.

First of all, the damper clutch 34 is held in the connected position and thus in the high spring rate state when the engine is started (Vehicle: stopped (*1)). That is, the damper clutch 34 is configured to be held in the connected state and thus in the high spring rate state when the engine has been stopped, and accordingly this high spring rate state can still be kept on start of the engine.

In some embodiments, since the hydraulic pump 27 is stopped and the damper clutch 34 does not have the power transmitting capacity when the engine E is in the stopped state, in a strict sense the damper clutch 34 is not in the "high spring rate state" but in "substantially same state as the high spring rate state" although it is in the connected state. That is, since hydraulic pressure is supplied to the hydraulic valve 30 by the accumulator 26 and additionally urging force of the Belleville spring 36 is applied to the damper clutch 34 even though the oil pump 27 is stopped when the engine E is stopped, the connected state of the damper clutch 34 can be still held. This reduces or eliminates the need of the damper clutch 34 to be switched to the connected state in order to have the high spring rate state on start of the engine E and thus to improve its response.

Then when the vehicle is gently accelerated by gently operating the acceleration pedal (throttle) (Gentle start (*20)), the damper clutch 34 is switched to the separated position and thus the low spring rate state and after this gentle acceleration when the vehicle is held at a substantially constant running speed (Low speed cruise) (i.e. low running speed in a state in which the throttle opening is lower than a predetermined degree), the damper clutch 34 is held in the separated position and thus in the low spring rate state.

Then when the vehicle is rapidly accelerated (Rapid acceleration) by suddenly operating the acceleration pedal, torque-down control of the engine E is performed by fuel-cut and additionally the damper clutch 34 is moved to the connected position and switched to the high spring rate state after the slip control has been performed. That is, according to some embodiments, the power transmitting apparatus is structured so that the shift from the low spring rate state to the high spring rate state can be attained by switching the damper clutch (spring property switching device) 34 to the connected state subject to performance of a torque-down control of the engine E.

Thus it is possible to temporarily reduce the torque applied to the first damper 33a by switching the damper clutch (spring property switching device) 34 to the connected state subject to performance of a torque-down control of the engine E, and accordingly it is possible to avoid movement of the damper clutch 34 to the connected state under the actuated state of the first damper 33a. Thus, it is possible to better perform damping of the torque variation due to the first damper 33a under the high spring rate state. In addition, according to some embodiments, the shift (switching) from the low spring rate state to the high spring rate state can be performed subject to performance of the torque-down control of a predetermined time interval. This enables reduction of the "predetermined time interval" and thus can reduce a feeling of idle running of a vehicle caused by torque drop during the shift of the spring property switching device.

Then, when substantially constant speed (High speed cruise) (i.e. a high-speed running of vehicle at a throttle opening higher than the predetermined degree) is kept after the rapid acceleration of the vehicle, the damper clutch 34 is held at the connected position and the high spring rate state can be kept. Accordingly, when the vehicle speed is reduced with stopping the acceleration pedal operation, the damper clutch 34 is configured to move to the separated position after the slip control and to switch to the low spring rate state and then to switch to the high spring rate state by being moved to the connected position when the vehicle has reached the predetermined speed.

According to some embodiments, the power transmitting apparatus is controlled so that it is switched to the high spring rate state in the resonation range with the engine E in the low spring rate state (i.e. in a vehicle speed lower than the low speed (V1) in FIG. 12) and switched to the low spring rate state in the resonation range with the engine E in the high spring rate state (i.e. in a vehicle speed higher than the low speed (V1) and lower than the high speed (V2) in FIG. 12) under a running state of vehicle in which the engine E is rotating at a speed lower than the idling speed during deceleration of the vehicle (Gentle deceleration). In addition, the power transmitting apparatus of some embodiments is structured so that the torque-down control under the deceleration of vehicle is performed by an electric throttle opening control or a valve lift-up control when it is switched from the low spring rate state to the high spring rate state just before stop of the engine E.

Figure 24:
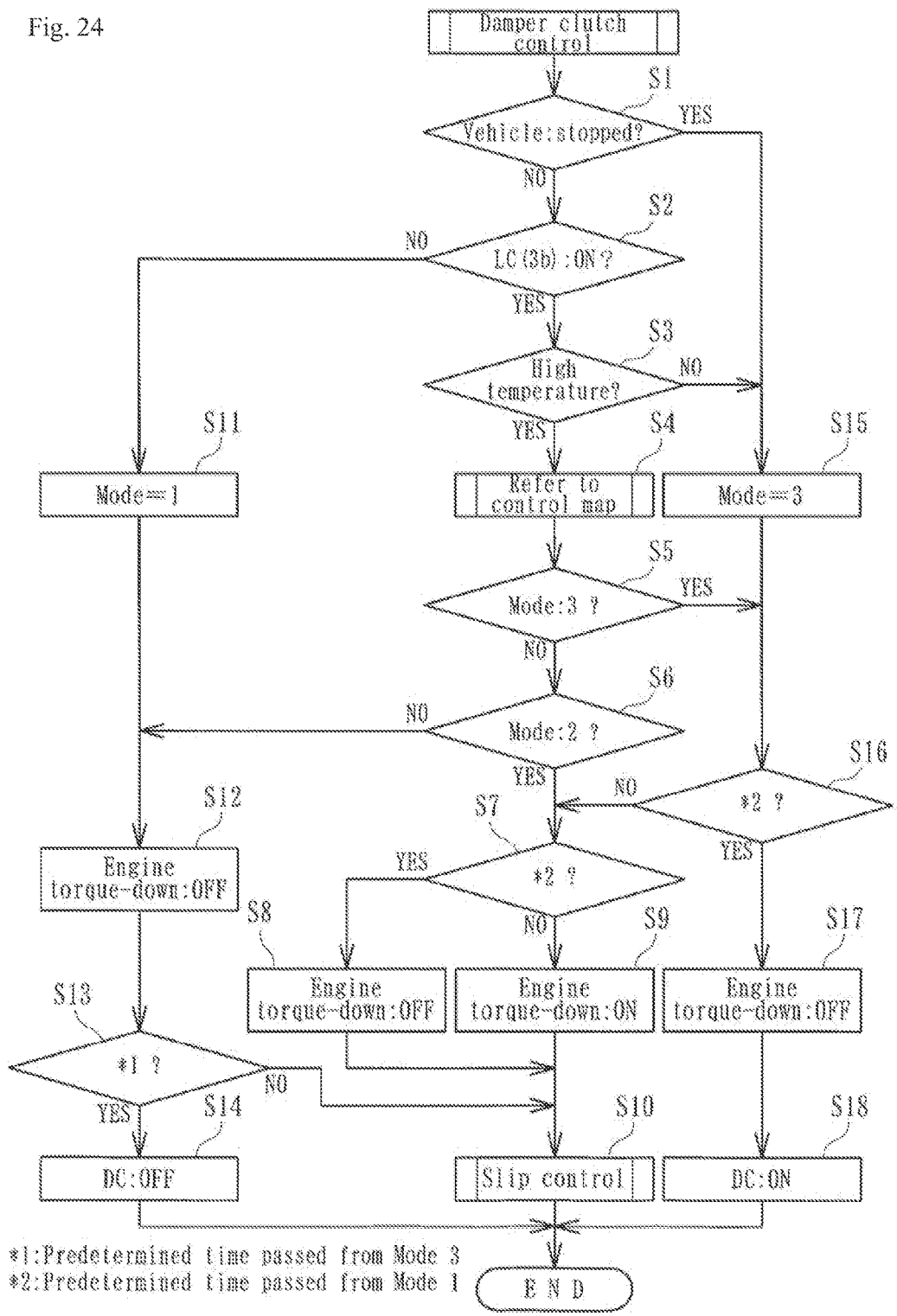
FIG. 24 is a flowchart showing contents of control of the spring property controller of the power transmitting apparatus of FIG. 16.

Referencing FIG. 24, contents of control of the damper clutch 34 (i.e. contents of control of the spring property controller 14) of some embodiments will be described.

First of all, the control routine determines whether the vehicle is in a stopped state (S1). When determined that the vehicle is not in a stopped state, the control routine goes to step S2 and determines whether the second clutch device 3b is actuated (i.e. whether it is in the second power transmitting system in which the driving power of the engine E is transmitted to the wheels D not via the torque converter 1). When the second clutch device 3b is actuated and it is in the second power transmitting system, the control routine goes to step S3 and determines whether the temperature of hydraulic fluid is higher than a predetermined value.

When it is determined that temperature of hydraulic fluid is higher than a predetermined value at step S3, the control routine goes to step S4 and refers to the control map of FIG. 12. That is, the damper clutch 34 is switched between the high spring rate state and the low spring rate state by switching of the damper clutch 34 depending on running state of the vehicle. As a result of the reference to the control map, a determination whether it should be set to Mode 3 (S5) or a determination whether it should be set to the Mode 2 (S6) is sequentially performed. When determined that it should be set to Mode 2 at step S6, the control routine goes to step S7 and determines whether a predetermined time has passed from Mode 1 (i.e. a necessary torque-down time has passed). When it is determined that the predetermined time has not passed yet, the control routine goes to step S9 to perform the torque-down control of the engine E and then goes to step S10 to perform control (i.e. slip control) of the Mode 2. On the other hand, when it is determined that the predetermined time has passed from Mode 1, the control routine goes to step S8 to terminate the torque-down control of the engine E and then goes to step S10 to perform control (i.e. slip control) of the Mode 2.

On the other hand, as a result of the reference to the control map, when the control routine determines that the damper clutch 34 should be set to Mode 3 at step S5, the control routine goes to step S16 in which it is determined whether a predetermined time has passed from Mode 1. When it is determined that a predetermined time has passed, the control routine goes to step S17 and terminates the torque-down control of the engine E and then goes to step S18 and switches to the high spring rate state with moving the damper clutch 34 to the connected position in accordance the setting in Mode 3. When the control routine determines at step S16 that a predetermined time has not passed from Mode 1 (i.e. a predetermined time has not passed from a change of running state of the vehicle), the control routine goes to step S10 and performs the control of Mode 2 (slip control) after the torque-down control is performed at S7 to S9.

In addition, as a result of the reference to the control map, when the control routine determines that the damper clutch 34 should not be set to Mode 2 at step S6, the control routine goes to step S12 and terminates the torque-down control of the engine E and then goes to step S13 in which it is determined whether a predetermined time has passed from Mode 3. When it is determined at step S13 that a predetermined time has passed from Mode 3, the control routine goes to step S14 and does not actuate the damper clutch 34 in accordance with the setting of the Mode 1 (i.e. moves the damper clutch 34 to the separated position) to obtain the low spring rate state. On the other hand, when it is determined at step S13 that a predetermined time has not passed from Mode 3 (i.e. a predetermined time has not passed from a change of running state of the vehicle), it goes to step S10 and performs the control of Mode 2 (slip control).

Furthermore, when determined at step S2 that the second clutch device 3b is not actuated and is in the first power transmitting system, the control routine goes to step S11 without referring to the control map and steps S12-S14 are sequentially performed after setting of Mode 1. Similarly, when the control routine determines that the temperature of the hydraulic fluid is lower than the predetermined value at step S3, the control routine goes to S15 without referring to the control map and steps S16-S18 are sequentially performed after setting of Mode 3 at step S15.

Figure 25:
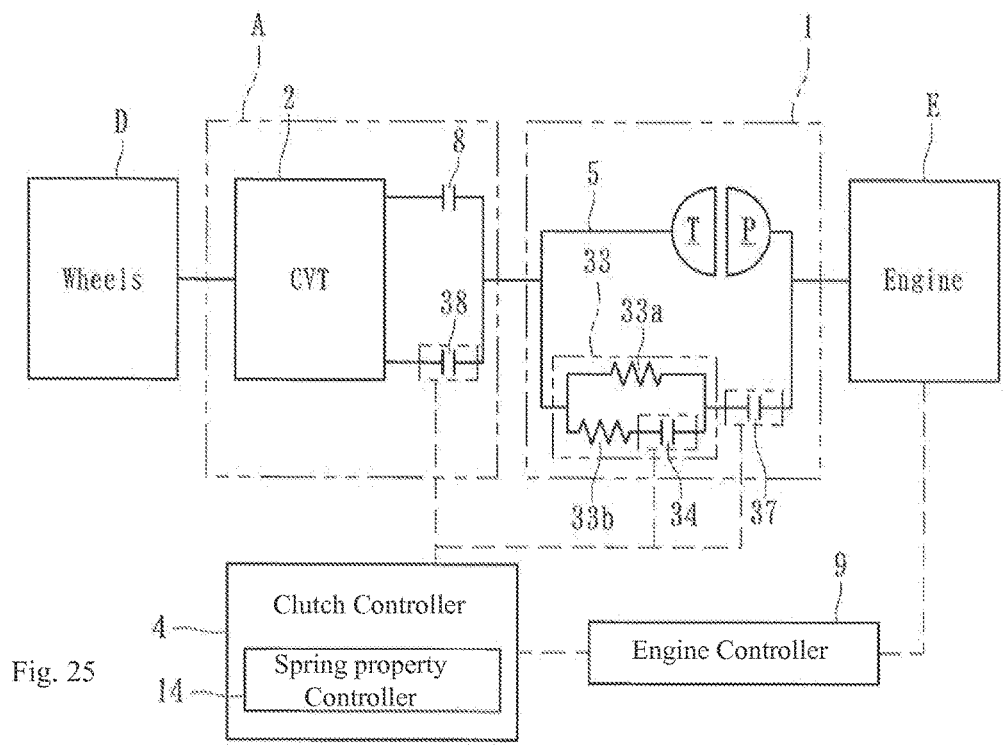
FIG. 25 is a schematic view showing basic concept of the power transmitting apparatus of a modification of the second embodiment of the present disclosure.

The power transmitting apparatus shown in FIG. 17 may be modified to that shown in FIG. 25 in which a clutch device 37 (which can serve as a clutch means) for switching the first and second power transmitting systems (corresponding to the second clutch device 3b of the second embodiment of FIG. 17) is arranged within the torque converter 1. In this modification, a separate clutch device 38 (which can serve as a clutch means) for switching forward and reverse of the vehicle is arranged within the transmission apparatus A in parallel with the third clutch device 8 at an upstream side of the CVT 2. The arrangement of the clutch device 37 for switching the first and second power transmitting systems within the torque converter 1 can facilitate efficient switching operation and simplification of the external structure of the torque converter 1.

According to the power transmitting apparatus of some embodiments, since the power transmitting apparatus comprises a spring property switching device (damper clutch 10; 34) for arbitrarily switching spring properties of the damper mechanism 7; 33; and a spring property controller 14 for actuating the spring property switching means 10; 34 to switch the spring properties to those according to the running state of the vehicle, it is possible to sufficiently damp the torque variation and also to further improve the fuel consumption.

In addition according to some embodiments, since the power transmitting apparatus comprises a torque converter 1 mounted on the vehicle and having a torque amplifying function, and a clutch device 3 for switching a power transmitting system between a first power transmitting system (1a, P, T, 5) for transmitting the driving power of the engine E to the wheels D via the torque converter 1 and a second power transmitting system (13, 7c, 6; 13, 35, 6) for transmitting the driving power of the engine E to the wheels D without power transfer through the torque converter 1, and the damper mechanism 7; 33 is disposed in the power transmission path of the second power transmitting system (13, 7c, 6; 13, 35, 6), it is possible to keep the second power transmitting system over a wider engine rotational speed range, to sufficiently damp the torque variation and also to further improve the fuel consumption.

Figure 26:
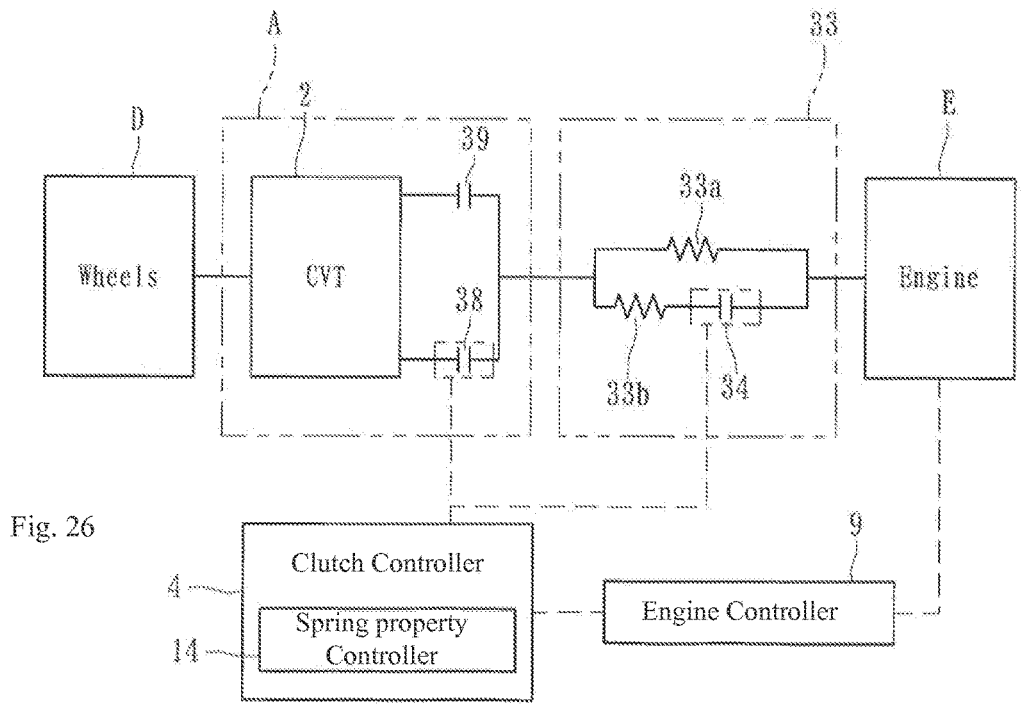
FIG. 26 is a schematic view showing basic concept of the power transmitting apparatus of another modification of the second embodiment of the present disclosure (e.g., applied to a vehicle not provided with the torque converter).

Although several embodiments are described in the present disclosure, the present disclosure is not limited to these embodiments. For example, the clutch device is not limited to that for switching the first power transmitting system for transmitting the driving power of the engine E to the wheels D via the torque converter 1 and second power transmitting system for transmitting the driving power of the engine E to the wheels D without power transfer through the torque converter 1 and it is possible to use a clutch 38 for forward running of vehicle arranged in the power transmission path of the power transmitting system of the engine E as shown in FIG. 26. In FIG. 26, a reference numeral 39 denotes a reverse clutch arranged in the power transmission path of the power transmitting system of the engine E, a numeral 34 denotes a damper clutch, and a numeral 33 denotes a damper mechanism including a damper clutch 34 etc. Such a power transmitting apparatus can be also applied to vehicles not provided with the torque converter 1.

In addition, although it is described that the damper mechanism comprises at least two dampers of the first damper 7a; 33a and the second damper 7b; 33b and the low spring rate state and the high spring rate state can be obtained by switching the connection of the first damper 7a; 33a and the second damper 7b; 33b by the damper clutch 10; 34 as the spring property switching device, it may be possible to form the damper mechanism with three or more dampers and to obtain a plurality of spring rate states in accordance with running states of vehicle by switching the dampers. In this case, the plurality of dampers (the first and second dampers (7a, 33a; 7b, 33b) of the present embodiments) may be formed of those having different spring constants or those having same spring constant and able to be switched to the low and high spring rate states by changing their combinations.

Furthermore, although it is described that the damper property switching device comprises the damper clutch 10; 34, it may be possible to use other devices or apparatuses different from the clutch as a switching device or means. In addition, the spring property may be changed by arbitrarily switching supporting portions of the dampers with use of the damper property switching device. In addition, it may be possible to use other configuration as the clutch device than that which is switched between the first power transmitting system for transmitting the driving power of the engine E to the wheels D via the torque converter 1 and second power transmitting system for transmitting the driving power of the engine E to the wheels D without power transfer through the torque converter 1.

The present embodiments can be applied to any power transmitting apparatus irrespective of having a different external appearance or other additional functions if it is a power transmitting apparatus comprising a spring property switching device for arbitrarily switching spring properties of the damper mechanism; and a spring property controller for actuating the spring property switching device to switch the spring properties according to the running state of the vehicle.

What is claimed is:
1. A power transmitting apparatus of a vehicle comprising a damper mechanism including at least first and second dampers having spring properties for damping torque variations of an engine and being able to arbitrarily and selec- tively transmit or cut off a driving power of an engine to wheels, wherein the power transmitting apparatus further comprises:
- a spring property switching means for arbitrarily switching spring properties of the damper mechanism;
- a detecting means for detecting running states of the vehicle; and
- a spring property controller for actuating the spring property switching means based on electric signals from the detecting means to switch the spring properties according to the running state of the vehicle.

2. The power transmitting apparatus of claim 1 wherein the power transmitting apparatus further comprises a torque converter mounted on the vehicle and having a torque amplifying function, and a clutch means for switching a power transmitting system between a first power transmitting system for transmitting the driving power of the engine to the wheels via the torque converter and a second power transmitting system for transmitting the driving power of the engine to the wheels without power transfer through the torque converter, and wherein the damper mechanism is disposed in the power transfer path of the second power transmitting system.

3. The power transmitting apparatus of claim 2 wherein the spring property switching means comprises a damper clutch for cutting off or connecting a predetermined portion of the second power transmitting system in accordance with a signal from the spring property controller.

4. The power transmitting apparatus of claim 3 wherein the damper clutch can be slip-controlled during the switching process for cutting off and connecting the predetermined portion of the second power transmitting system.

5. The power transmitting apparatus of claim 4 wherein the spring property controller holds a predetermined control map capable of referring to a control mode depending on a running state of the vehicle and can control the spring property switching means in accordance with the control mode of the control map.

6. The power transmitting apparatus of claim 5 wherein the spring property controller can refer to the control map only when the temperature of operating oil of the damper clutch is higher than a predetermined value.

7. The power transmitting apparatus of claim 3 wherein the damper clutch is disposed within the torque converter.

8. The power transmitting apparatus of claim 7 wherein the transmission apparatus including the torque converter and the transmission unit is disposed in the power transfer path of the power transmitting system from the engine to the wheel and the clutch means is disposed within the transmission apparatus.

9. The power transmitting apparatus of claim 8 wherein the transmission unit is an automatic transmission.

10. The power transmitting apparatus of claim 9 wherein the automatic transmission is a Continuously Variable Transmission.

11. The power transmitting apparatus of claim 8 wherein the clutch means is disposed within the torque converter.

12. The power transmitting apparatus of claim 1 wherein the damper mechanism comprises a first damper and a second damper, and wherein the spring constant of the damper mechanism can be switched between a low spring rate state and a high spring rate state by arbitrarily and selectively connecting the first damper and the second damper by the spring property switching means.

13. The power transmitting apparatus of claim 12 wherein the low spring rate state can be attained by connecting both the first damper and the second damper in series with respect to a power transmitting system of the engine, and the high spring rate state can be attained by connecting either one of the first damper or the second damper to a power transmitting system of the engine.

14. The power transmitting apparatus of claim 12 wherein the damper mechanism is formed of a connection in which a power transmitting system having the first damper and a power transmitting system having the second damper and the spring property switching means are connected in parallel each other, and wherein a shift from the low spring rate state to the high spring rate state can be attained by switching the spring property switching means to the connected state.

15. The power transmitting apparatus of claim 14 wherein the shift from the low spring rate state to the high spring rate state can be attained by switching the spring property switching means to the connected state subject to performance of a torque-down control of the engine.

16. The power transmitting apparatus of claim 15 wherein the shift from the low spring rate state to the high spring rate state can be performed subject to performance of the torque-down control of a predetermined time interval.

17. The power transmitting apparatus of claim 14 wherein the first damper is arranged at an overlapped position radially outward from an outer circumference of the spring property switching means.

18. The power transmitting apparatus of claim 12 wherein the power transmitting apparatus further comprises an urging means for normally urging the spring property switching means toward the connected state.

19. The power transmitting apparatus of claim 12 wherein the power transmitting apparatus further comprises a torque converter mounted on the vehicle, and wherein an output member of a turbine of the torque converter is formed with through apertures through which operating fluid for actuating the spring property switching means can flow.

20. The power transmitting apparatus of claim 12 wherein a holding member holding the first damper is formed with through apertures through which operating fluid for actuating the spring property switching means can flow.

21. The power transmitting apparatus of claim 12 wherein when the vehicle is in a running state in which the engine rotates at a rotational speed lower than an idle speed during the vehicle is in the deceleration state, the spring property switching means switches a spring rate to the high spring rate state at a range resonating with the engine in the low spring rate state and switches a spring rate to the low spring rate state at a range resonating with the engine in the high spring rate state.

22. The power transmitting apparatus of claim 12 wherein when the vehicle is in a running state in which a running speed of the vehicle is held substantially constant at a throttle opening smaller than a predetermined opening or in a running state in which the vehicle is accelerated more gently than a predetermined degree, the spring property switching means switches a spring rate to the low spring rate state.

23. The power transmitting apparatus of claim 12 wherein when the vehicle is in a running state in which the vehicle is accelerated more rapidly than a predetermined degree, the spring property switching means switches a spring rate to the high spring rate state.

24. The power transmitting apparatus of claim 12 wherein the spring property switching means switches a spring rate to the high spring rate state when the engine is stopped and holds the high spring rate state when the engine is started.

25. A power transmitting apparatus of a vehicle comprising:
- a damper mechanism operably coupled with an input shaft configured to receive driving power from an engine, the damper mechanism including two or more dampers, each of the two or more dampers having spring properties for damping torque variations of an engine, the damper mechanism configured to arbitrarily and selectively transmit or cut off a driving power of an engine to wheels;
- a spring property switching device connected to a driving shaft of the power transmitting apparatus and fluidly connected to a source of hydraulic fluid, the spring property switching device configured to selectively switch spring properties of the damper mechanism;
- a detecting device having at least one sensor and configured to detect running states of the vehicle; and
- a spring property controller operably connected to the detecting device and configured to actuate the spring property switching device based on electric signals from the detecting device to switch the spring properties according to the running state of the vehicle.

* * * * *